(12) United States Patent
Amatucci et al.

(10) Patent No.: US 10,644,314 B2
(45) Date of Patent: May 5, 2020

(54) ELECTRODE MATERIAL FOR LITHIUM BATTERIES

(71) Applicant: Rutgers, The State University of New Jersey, New Brunswick, NJ (US)

(72) Inventors: Glenn Amatucci, Peapack, NJ (US); Matthew Y. Lu, North Brunswick, NJ (US); Fadwa Badway, Old Bridge, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 15/776,268

(22) PCT Filed: Dec. 6, 2016

(86) PCT No.: PCT/US2016/065086
§ 371 (c)(1),
(2) Date: May 15, 2018

(87) PCT Pub. No.: WO2017/100165
PCT Pub. Date: Jun. 15, 2017

(65) Prior Publication Data
US 2019/0260027 A1 Aug. 22, 2019

Related U.S. Application Data

(60) Provisional application No. 62/263,993, filed on Dec. 7, 2015.

(51) Int. Cl.
*H01B 1/06* (2006.01)
*H01M 10/00* (2006.01)
(Continued)

(52) U.S. Cl.
CPC .......... *H01M 4/5825* (2013.01); *C01B 25/45* (2013.01); *H01B 1/06* (2013.01); *H01M 10/052* (2013.01);
(Continued)

(58) Field of Classification Search
CPC .. H01B 1/00; H01B 1/06; H01M 5/58; H01M 10/052
See application file for complete search history.

(56) References Cited

U.S. PATENT DOCUMENTS 4,009,092 A * 2/1977 Taylor ..................... C01B 25/45
204/242
8,518,604 B2 * 8/2013 Amatucci ............. H01M 4/364
429/220
(Continued)

FOREIGN PATENT DOCUMENTS

WO 2009/061167 A1 5/2009

OTHER PUBLICATIONS

Odynets et al "Synthesis and structural investigations of tantalates phosphates in the flux system Na2O—P2O5—Ta2O5—MoO3", International Conference on Oxide Materials for Electronic Engineering OMEE—2012.*

(Continued)

*Primary Examiner* — Mark Kopec
(74) *Attorney, Agent, or Firm* — Greenberg Traurig, LLP

(57) ABSTRACT

Substitution of tantalum into the lattice of monoclinic niobium phosphate results in improved reversibility, near 0% irreversible loss, and similar excellent 20 C high rate behavior in large grain material without the formation of electronically conducting nanocomposites. Tantalum substitution into niobium pentaphosphate enables an improved stabilization of the difficult to fabricate monoclinic niobium phosphate phase. Such tantalum-substituted niobium phos- (Continued)

phates show excellent potential for use as electrodes in lithium or lithium-ion batteries.

7 Claims, 16 Drawing Sheets

(51) Int. Cl.
      *H01M 4/58*       (2010.01)
      *C01B 25/45*       (2006.01)
      *H01M 10/052*       (2010.01)

(52) U.S. Cl.
      CPC ...... *C01P 2002/72* (2013.01); *C01P 2006/40* (2013.01); *Y02T 10/7011* (2013.01)

(56) References Cited

U.S. PATENT DOCUMENTS

| | | | | |
|---|---|---|---|---|
| 2014/0138591 | A1* | 5/2014 | Yoon | C01B 25/45 252/519.14 |
| 2016/0190585 | A1* | 6/2016 | Yoon | H01M 4/485 429/231.5 |
| 2018/0219221 | A1* | 8/2018 | Yamauchi | H01G 11/06 |

OTHER PUBLICATIONS

Lee :Investigation of physical and electrochemical properties of tantalum-doped beta niobium phosphate as an electrode for lithium batteries, thesis submitted to Rutgers University Oct. 2015 (60 pages).*

Nishiyama et al "Effects of distortion of metal-oxygen octahedra on photocatalyic water-splitting performance of RuO2-loaded niobium and tantalum phosphate bronzes", ChemSusChem 2011, 4, 208-215.*

Patoux et al "Chemical and electrochemical insertion of lithium into two allotropic varities of NbPO5", Chem. Mater. 2002, 14, 2334-2341.*

Huang et al "Oxygen reduction reaction of (Pt—NbPOx)/MXCNTs electrodes prepared by microwave irradition method", J Solid State Electrochem (2008) 12:113-119.*

Lugmair et al "Single source molecular precursors to Niobia-Silica and niobium phosphate materials#", Monatshefte fur Chemie 137, 557-566 (2006).*

Serra et al "Structure of Orthorhombic NbPO5", Acta Cryst. (1992), C48, 733-735.*

International Search Report and Written Opinion dated Feb. 28, 2017, issued by the European Patent Office in International Application No. PCT/US16/065086 (17 pages).

Nishiyama, et al., "Effects of Distortion of Metal-Oxygen Octahedra on Photocatalytic Water-Splitting Performance of RuO2-Loaded Niobium and Tantalum Phosphate Bronzes", Chemsuschem, vol. 4, No. 2, Feb. 16, 2011, pp. 208-215.

Dhanesh, et al., "Microwave dielectric properties of BaNbTaP0 (xĂ=ÅO, 0.5, 1, 1.5 and 2) ceramics", Journal of Materials Science: Materials in Electronics, Kluwer Academic Publishers Bo, vol. 23, No. 6, Dec. 3, 2011, pp. 1268-1271.

Chahboun, et al. "beta-NbP05 and beta-TaP05: Bronzoids, second members of the monophosphate tungsten bronze series (P02)4(W03)2m", Journal of Solid State Chemistry, Orlando, FL, US, vol. 65, No. 3, Dec. 1, 1986, pp. 331-342.

Stanford, et al. "A vibrational spectral study of hydrated tantalum phosphate (TaP05) phases", Journal of Solid State Chemistry, vol. 85, No. 2, Apr. 1, 1990, pp. 326-331.

Levin, et al., "The system niobium pentoxide-phosphorus pentoxide", Journal of Solid State Chemistry, Orlando, FL, US, vol. 2, No. 2, Aug. 1, 1970, pp. 250-261.

Maria Ziolek, "Niobium-containing catalysts-the state of the art", Catalysis Today, vol. 78, No. 1-4, Feb. 1, 2003, pp. 47-64, XP055567634.

* cited by examiner

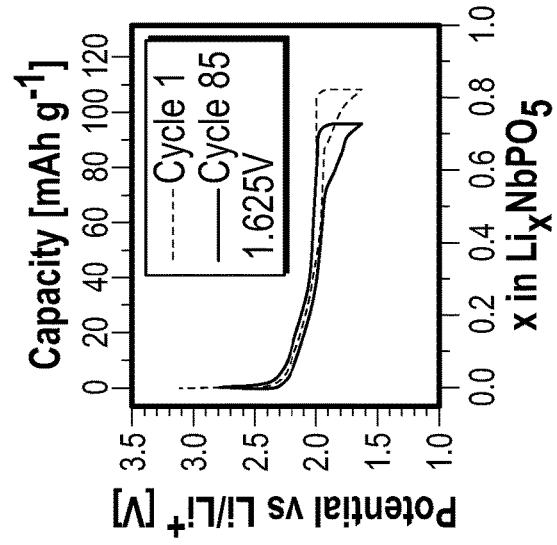
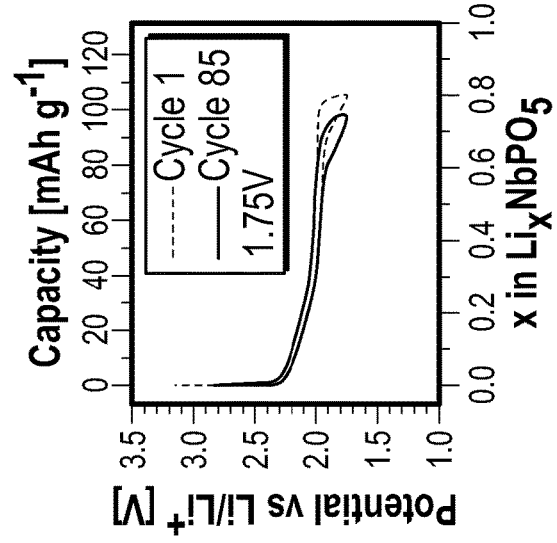
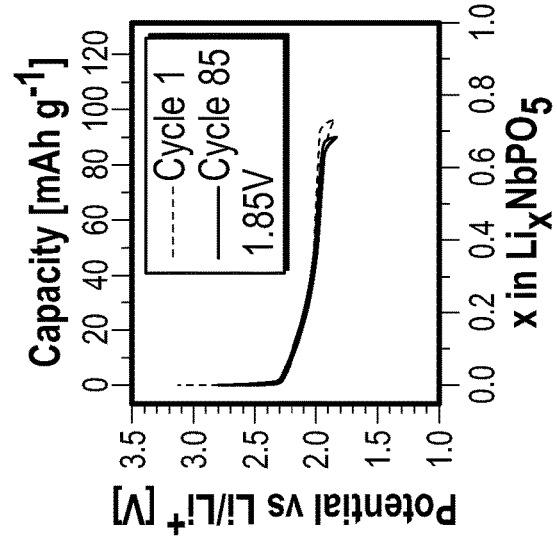
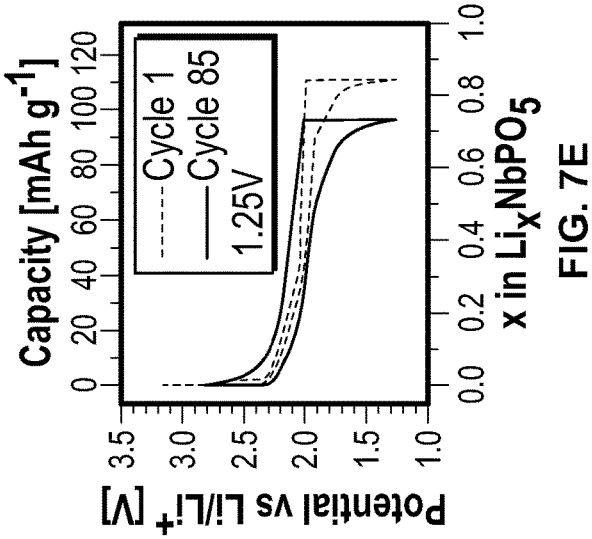
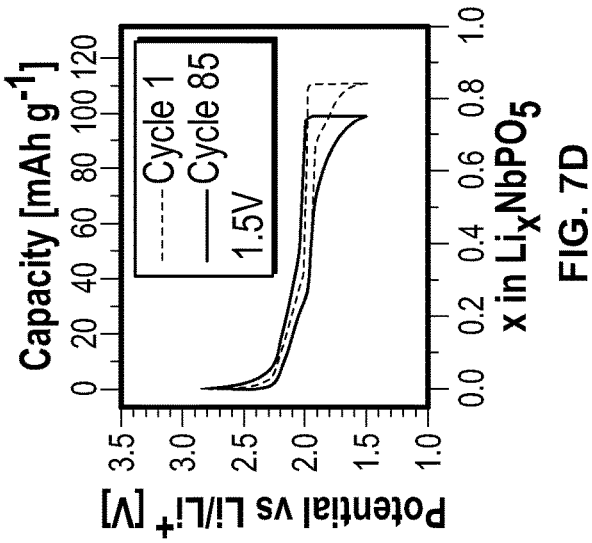

ELECTRODE MATERIAL FOR LITHIUM BATTERIES

CROSS-REFERENCE TO RELATED APPLICATIONS

The present application claims the benefit of U.S. Provisional Patent Application No. 62/263,993 which has a filing date of Dec. 7, 2015 and is incorporated by reference herein in its entirety.

STATEMENT OF GOVERNMENT FUNDING

The invention disclosed herein was made with government support under a contract from the U.S. government. The United States government has certain rights in the invention.

FIELD OF THE INVENTION

The present invention relates generally to electrochemical cells and a method for making same. More particularly, the present invention relates to a substituted niobium phosphate material suitable for use as an electrode of a lithium or lithium-ion battery.

BACKGROUND OF THE INVENTION

The increase in demand for longer-lasting battery-powered devices such as portable electronics and electric vehicles creates a need for energy storage technologies that provide higher energy and power densities. The relatively sluggish progress of lithium-ion batteries, first commercialized by Sony in 1991, demonstrates the need for new electrode materials that meet consumer demands and expectations. In the last few decades, intercalation materials containing phosphate groups ($PO_4$) have garnered interest due to several intrinsic advantages. The robust structure of the $PO_4$ group provides an open 3D network allowing for long term cycling and high ionic diffusion rates. The inherent stability of the $PO_4$ group derives from the tetrahedral coordination of the phosphorous-oxygen covalent bonds, which engender several desirable properties including resistance to thermal degradation and overcharge. The most well-known phosphate, the triphylite $LiFePO_4$, was first introduced in 1997. This phospholivine of type $LiMPO_4$ (M=Co, Cu, Fe, Mn, Ni) is an inexpensive, environmentally friendly, but low energy cathode material that requires various conductive additives to enable exceptionally high power. Subsequent to this pioneering work, there has been great interest in phosphate intercalation compounds for positive and negative electrodes in lithium batteries. Metal phosphates are also being investigated as model intercalation materials to further the understanding of the intrinsic reaction mechanisms and limitations to elucidate new pathways towards improved battery technology.

SUMMARY OF THE INVENTION

In an embodiment of the present invention, a composition comprises a substituted niobium phosphate of the formula $M_xNb_{(1-x)}PO_5$, wherein M is one or more transition metals. In an embodiment, each of the transition metals is from one of Group 5 and Group 6. In an embodiment, the one or more transition metals include tantalum. In an embodiment, the one or more transition metals are substituted for up to 20% of the niobium (i.e., $x \leq 0.20$). In an embodiment, the one or more transition metals are substituted for up to 10% of the niobium (i.e., $x \leq 0.10$). In an embodiment, the one or more transition metals are substituted for up to 5% of the niobium (i.e., $x \leq 0.05$). In an embodiment, the one or more transition metals are substituted for up to 2% of the niobium (i.e., $x \leq 0.02$). In an embodiment, the one or more transition metals are substituted for up to 1% of the niobium (i.e, $x \leq 0.01$).

In an embodiment, the substituted niobium phosphate is predominately in a monoclinic crystalline form. In an embodiment, at least 80% of the substituted niobium phosphate is in a monoclinic crystalline form. In an embodiment, at least 90% of the substituted niobium phosphate is in a monoclinic crystalline form. In an embodiment, at least 95% of the substituted niobium phosphate is in a monoclinic crystalline form. In an embodiment, the substituted niobium phosphate consists essentially of its monoclinic crystalline form. In an embodiment, the substituted niobium phosphate has a crystalline structure having the lattice parameters of a=13.1 Å (+/−0.2 Å), b=5.3 Å (+/−0.2 Å), c=13.2 Å (+/−0.2 Å) and the Beta angle=120.7° (+/−1°). In an embodiment, the substituted niobium phosphate contains is essentially free of amorphous materials.

In an embodiment, the substituted niobium phosphate is present in an electrode in a lithium battery. In an embodiment, the substituted niobium phosphate is present in an electrode in a lithium-ion battery. In an embodiment, the substituted niobium phosphate is present in a positive electrode in a lithium battery. In an embodiment, the substituted niobium phosphate is present in a negative electrode in a lithium battery.

BRIEF DESCRIPTION OF THE FIGURES

For a more complete understanding of the present invention, reference is made to the following detailed description of exemplary embodiments considered in conjunction with the accompanying drawings, in which like structures are referred to by like numerals throughout the several views, and in which:

FIGS. 7A-7E are voltage profiles at cycle 1 and cycle 85 for an unsubstituted lithiated niobium phosphate according to an embodiment of the present invention at various cut-off voltages;

DETAILED DESCRIPTION OF THE INVENTION

In an embodiment, the present invention advantageously employs the effects of crystalline-phase transitions and metal ion substitutions in monoclinic β-phase niobium phosphate (β-NbPO$_5$) to produce a novel electrode material for lithium and lithium-ion batteries. Isolation of lower-voltage phase transitions of pure β-NbPO$_5$ is highly effective in improving the long term cycling stability of the material. An analogous impact to cycling stability was identified through the use of effective solid solutions based on cations such as pentavalent tantalum (Ta$^{5+}$). The resulting materials exhibited excellent cycling stability, and exceptionally low first cycle irreversible loss, without the need for carbonaceous nanocomposites. Surprisingly, the Ta-substituted β-NbPO5 also shows very fast rate capabilities (charge and discharge).

Figure 1:
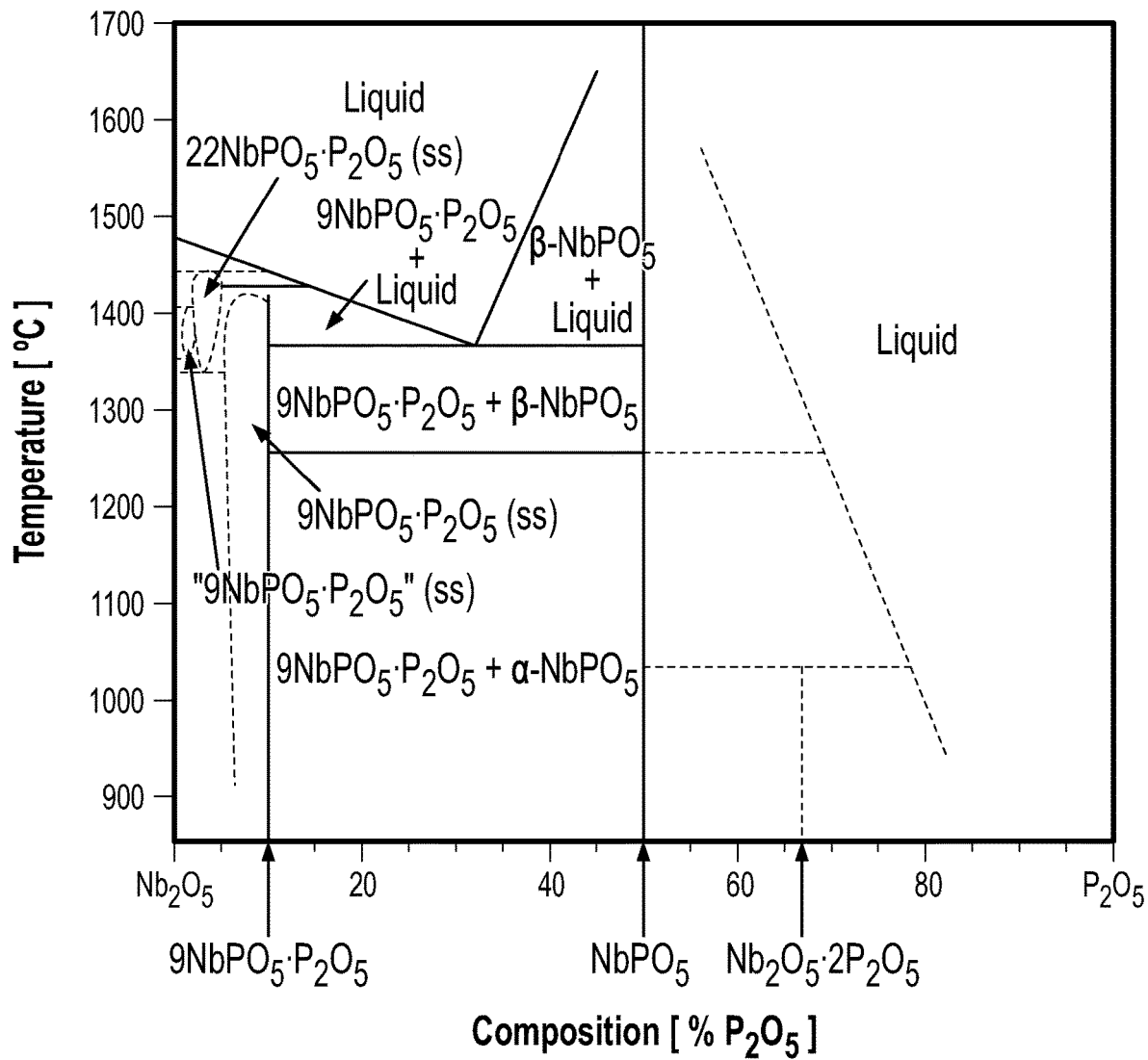
FIG. 1 is a $Nb_2O_5$—$P_2O_5$ phase diagram.

As illustrated along the 50:50 line composition of the phase diagram in FIG. 1 (adapted from Levin, E. M. & Roth, R. S. The System Niobium Pentoxide-Phosphorus Pentoxide. J. Solid State Chem. 2, 250-261 (1970), which is incorporated by reference herein in its entirety), NbPO$_5$ occurs in two allotropic forms: (1) the low temperature tetragonal α-NbPO5 and (2) the high temperature monoclinic β-NbPO5. The monoclinic unit cell can also be indexed with a simplified orthorhombic subcell with the relationships: $=a_m$ sin, $b_o=b_m$, $c_o=c_m/2$. β-NbPO$_5$ is the second member (m=2) of the monophosphate tungsten bronze series with pentagonal tunnels following the structure of $A_x(WO_3)_{2m}(PO_2)_4$ (A=Ag, Na, Li). The structure consists of NbO$_6$ octahedra separated by PO$_4$ tetrahedra with ReO$_3$-type chains, and is isostrucural with TaPO$_5$, TaVO$_5$, TiSO$_5$, ε-VPO$_5$, and WPO$_5$. The pentagonal tunnels run down the [010] axis that allow for insertion of small atoms such as Li, enabling excellent properties for electrochemical energy storage. This group of materials benefits from the polyanionic inductive effect, which produces higher voltages than the standard reduction potential of the transition metal redox. This is due to the oxygen atoms being permanently polarized towards the more electronegative PO$_4$ tetrahedra, thus lowering the covalent character of the M-O bond and increasing the potential of the M$^{5+}$/M$^{4+}$ redox couple.

It has been demonstrated in the prior art (Patoux, S. & Masquelier, C. Chemical and Electrochemical Insertion of Lithium Into Two Allotropic Varieties of NbPO5. Chem. Mater. 14, 2334-2341 (2002), which is incorporated by reference herein in its entirety) that monoclinic β-NbPO$_5$ has some reversibility down to 1.85V and achieves 90 mAh·g$^{-1}$ through 100 cycles and 120 mAh·g$^{-1}$ for 45 cycles down to 1.7V. Potentiostatic Intermittent Titration Technique (PITT) characterization revealed three intercalation plateaus upon lithiation at x=0.2, 0.5×0.7, and x=0.8 in β-LixNb1-xP05. X-ray diffraction revealed a solid solution mechanism for the two small plateaus, and a large two-phase reaction that corresponds to β-Li0.45NbPO5 and β'-Li0.75NbPO5. The second β'-Li0.75NbPO5 phase corresponds to a P21/c space group with a=13.145(3) Å, b=5.131(1) Å, c=13.415(3) Å, =120.02(1°), and V=783.4 Å3. As β-NbPO5 is further lithiated, an irreversible amorphization occurs beyond 1V. In contrast to the monoclinic phase, the tetragonal niobium phosphate was shown to demonstrate significant losses over 50 cycles with a sustained capacity of 90 mAh·g$^{-1}$ vs Li/Li+. Both phases of NbPO5 operate on the Nb$^{5+}$/Nb$^{4+}$ redox, located at 1.65V for the tetragonal phase and 2V for the monoclinic phase. These potentials are higher than the standard reduction potential around 1.6V. At low voltages, both phases experience an irreversible amorphization. An orthorhombic phase that is structurally similar to the monoclinic phase forms at lower temperatures, but no electrochemistry has been reported.

As disclosed herein, and in accordance with embodiments of the present invention, the electrochemical performance of β-NbPO$_5$ is improved through adjusting a variety of synthesis techniques, isolating phase reactions, and through various ionic substitutions. In embodiments of the present invention, solid state and solution methods are used alongside metal ion substitution into the β-NbPO$_5$ structure. In embodiments of the present invention, transition metals are selected for substitution based on their ionic radii and proximity on the periodic table as detailed in Table I. Because of similar ionic radii to the niobium ion, a stable pentavalent oxidation state, and the β-TaPO$_5$ end member being isostructural with β-NbPO$_5$, Ta$^{5+}$ is selected as an exemplary metallic ion. Examples wherein Mo$^{5+}$ is substituted in place of Ta$^{5+}$ are also presented for an ionic substitution comparison.

TABLE I

| Selected ions with coordination VI and their ionic radii | |
|---|---|
| Ion | Ionic Radius (Coordination VI) [Å] |
| Nb$^{5+}$ | 0.64 |
| Ta$^{5+}$ | 0.64 |
| Cr$^{5+}$ | 0.63 |
| W$^{5+}$ | 0.62 |
| Mo$^{5+}$ | 0.61 |

TABLE I-continued

Selected ions with coordination VI and their ionic radii

| Ion | Ionic Radius (Coordination VI) [Å] |
|---|---|
| $V^{5+}$ | 0.54 |

EXPERIMENTAL EXAMPLES

The following experimental examples are presented to illustrate representative embodiments of the present invention and are in no way intended to limit the scope of the invention. Variations and modifications of the representative embodiments, such as may be recognized by those having ordinary skill in the art and possession of the present disclosure are within the scope of the present invention.

Synthesis of Exemplary Materials

Both solid state and solution techniques were trialed to identify an optimum synthesis process. In the solid state process, stoichiometric ratios of the precursors: $Nb_2O_5$ (Aldrich), $Ta_2O_5$ (Alfa Aesar), and $(NH_4)_2HPO_4$ (Aldrich) were ground in 4 g batches in a mortar and pestle until homogeneous. Phase evolution was progressed through a series of anneals at 700° C., 900° C., and 1350° C. with heating and cooling rates detailed in Table II. Samples were removed and ground in a mortar and pestle between each annealing step to improve batch homogeneity.

TABLE II

Annealing conditions

| Temperature [° C.] | Heating Rate [° C. · min$^{-1}$] | Dwell Time [hr] | Cooling Rate [° C. · min$^{-1}$] |
|---|---|---|---|
| 700 | 6 | 3 | 6 |
| 950 | 5 | 7 | 8 |
| 1350 | 8 | 3 | 11 (or quench) |

For the solution process, $(NH_4)_2HPO_4$ was dissolved in 5 mL of deionized water (Aldrich) and then mixed with the corresponding metal oxides. The slurry was mixed and heated in a 20 cc alumina crucible with a magnetic spin bar on a hot plate until the $H_2O$ evaporated (approximately 30 minutes). Once dry, the sample was transferred directly to the furnace to follow the same heating protocol as noted above. Samples were quenched in air from 1350° C. (or other specified temperature) to room temperature using a drop furnace where the floor of the furnace was simply lowered, thereby exposing the crucibles to ambient temperatures. Previous experiments by Patoux, referenced above, required a very rapid quench to transform the tetragonal α-$NbPO_5$ to the β-$NbPO_5$, but an air quench provides sufficient cooling rates for such small samples.

Nanocomposites, when utilized, were prepared using a Spex 8000 mill with hardened steel balls and milling cells containing 10% weight of conductive carbon (Super P, MMM). Samples were milled in dry air or argon for 15 or 30 minutes. Milling times were minimized to reduce the probability of iron contamination. Initial tests revealed that forming carbon nanocomposites was unnecessary as the samples performed well without conductive additives. As such, unless otherwise specified, all materials presented in the present disclosure were not fabricated as nanocomposites.

Physical Characterization

Powder samples and electrodes were characterized using X-ray diffraction (XRD) with a Bruker D8 Advance diffractometer (Cu Kα, λ=1.54056 Å). Ex-situ XRD measurements were processed by disassembling the cell in an argon filled glovebox and extracting residual electrolyte from the cycled electrodes by rinsing with dimethyl carbonate (DMC). Electrodes were placed on a glass slide and sealed using Kapton film to minimize oxidation and moisture contamination. Rietveld refinements were run using TOPAS software utilizing a 5$^{th}$ order Chebychev polynomial background fit, sample height displacement and atomic position refinements assuming a pseudo-Voigt peak shape. No corrections were added for the conductive carbon and binder additives.

Electrochemical Characterization

To fabricate electrodes for electrochemical evaluation, β-$NbPO_5$ powders were cast through a doctor blade process in dry room conditions with humidity of less than 1% using the Bellcore method described in U.S. Pat. No. 5,418,091. The electrodes contained 54.7% active material (i.e., β-$NbPO_5$), 7.8% conductive carbon (Super P, MMM), 15.6% poly(vinylidene fluoride-co-hexafluoropropylene) binder (Kynar 2801, Elf Atochem), and 21.9% dibutyl phthalate plasticizer (Aldrich) in acetone. This composition equates to a 70 weight percent active material electrode after extraction of the plasticizer. Plasticizer was extracted from the electrode tapes in 99.8% anhydrous diethyl ether (Aldrich) and punched into ½" disks for storage and assembly in an argon-filled glove box. Cells were cycled against a pure lithium metal anode (FMC) in an Al-clad 2032 coin cell (Hohsen) with a 1M $LiPF_6$ in ethylene carbonate:dimethyl carbonate (EC:DMC 1:1 in volume) (BASF) electrolyte and glassfiber separator (Whatman).

Galvanostatic cycling was carried out on a Maccor cycler (Maccor Corporation Model 4000 battery cycler) as specified herein. High rate efficiency was evaluated from 7.5 mA·g$^{-1}$ (approximately C/20) to 2100 mA·g$^{-1}$ (approximately 20 C) with voltage cutoffs ranging between 1.25V and 2.80V at 24° C. Potentiostatic intermittent titration technique (PITT) tests were run on a Macpile potentiostat (Biologic Co., France) with 10 mV steps and a 2 mA·g$^{-1}$ cutoff current.

Results

Structure

Figure 2:
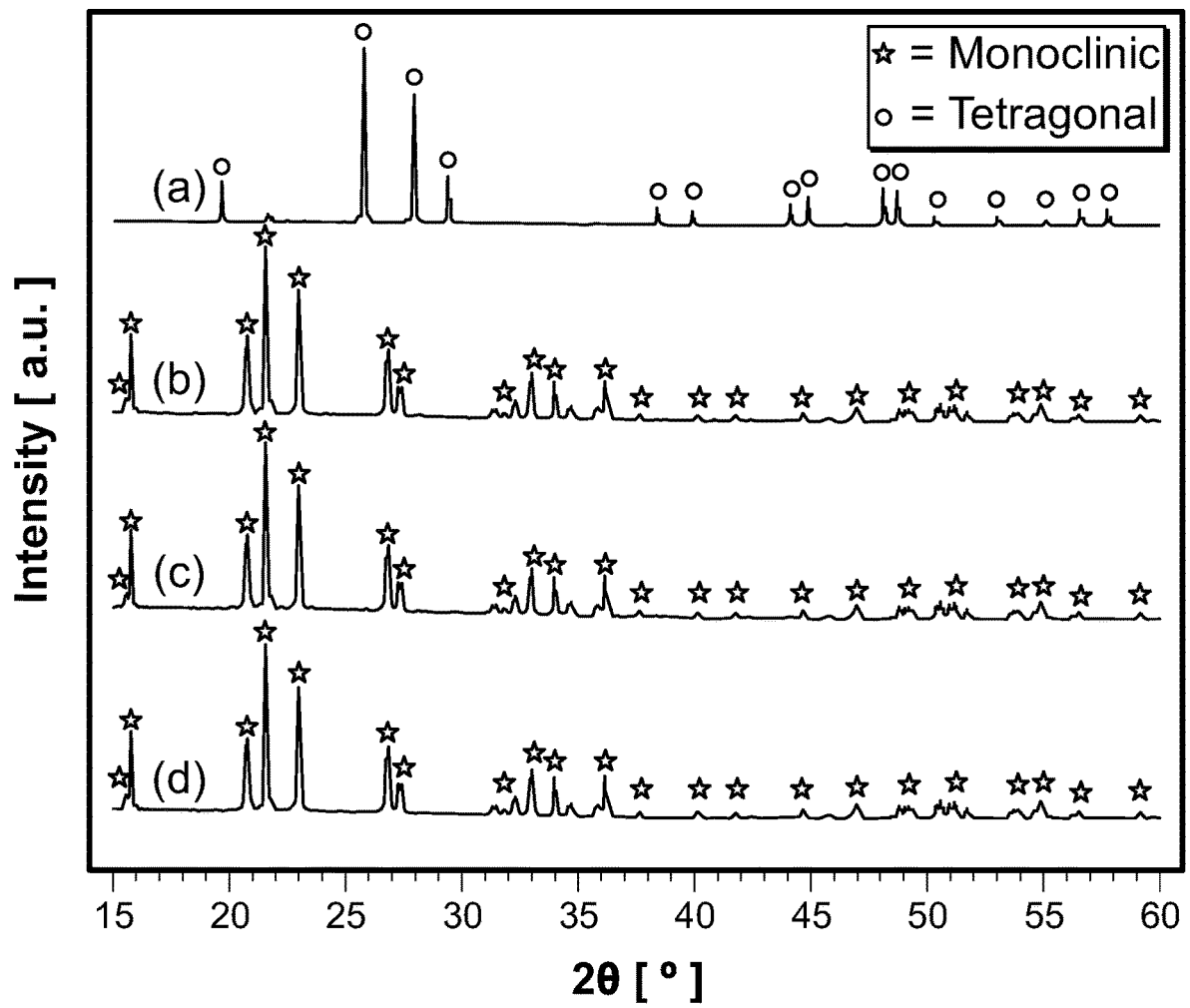
FIG. 2 is a group of x-ray diffraction patterns for niobium phosphate synthesized using solid state methods according to an embodiment of the present invention.

To evaluate the optimum synthesis methodology, samples were fabricated using the aforementioned solid state and solution methods along with quenching from various temperatures. After heating at 1350° C., unsubstituted samples were either immediately quenched or slowly cooled to 300° C. before quenching in air to room temperature. FIG. 2 shows some of the resulting XRD patterns. All such samples, except for the solid state sample quenched from 300° C., displayed 100% purity of the monoclinic β-$NbPO_5$. This difference was most likely due to a greater degree of inhomogeneity in the precursor mix. Based on enhanced purity, all reported samples were synthesized through a solution technique and quenched from 1350° C., unless otherwise specified.

Reports in the prior art indicate that a large excess of phosphorus is needed to produce a pure phase. It is also reported that $P_2O_5$ volatizes at 1070° C., which is much lower than the temperature required to form the high temperature monoclinic phase. However, as shown in the present disclosure, the methods of preparing substituted and nonsubstituted β-NbPO$_5$ disclosed herein surprisingly show that shortening the anneal times over those in the prior art minimizes the amount of phosphate evolution, such that only a 50% stoichiometric excess of phosphorus was needed to yield greater than 99% purity of the monoclinic phase. Table III details the purity of samples containing varying amounts of excess phosphorus heated to 1350° C. and quenched at 1350° C.

treatment. Lattice refinements via Rietveld analysis, shown in Table V, reveal that the unsubstituted NbPO$_5$ is in good agreement with the literature value for the monoclinic space group P2$_1$/c (Z=8) of a=13.0969(16) Å, b=5.2799(6) Å, c=13.2281(16) Å, and β=120.334(8°). All of the β-Ta$_x$Nb$_{1-x}$PO$_5$ samples were analyzed using Rietveld analysis with results also presented in Table V. The lattice parameters present no significant or systematic change with increasing amounts of Ta substitution, with only a maximum 0.17% change in the volume from 0% to 100% substitution as the ionic radii of Nb$^{5+}$ and Ta$^{5+}$ are nearly identical at 0.64 nm and thus the invariant result is consistent with Vegard's law.

TABLE V

Rietveld refinement data for various molar % Ta substitutions for Nb in NbPO$_5$. All samples were quenched from 1350° C.

| % Ta | Wt. % | R_ex | R_wp | R_p | GOF | a (Å) | b (Å) | c (Å) | Beta (°) | Volume (Å$^3$) |
|---|---|---|---|---|---|---|---|---|---|---|
| 0 | 100.0 | 6.86 | 8.78 | 6.89 | 1.28 | 13.08(4) | 5.27(7) | 13.22(6) | 120.68(1 | 785.45(7) |
| 2 | 100.0 | 4.35 | 5.83 | 4.53 | 1.34 | 13.08(7) | 5.27(9) | 13.23(4) | 120.69(2 | 786.40(3) |
| 5 | 100.0 | 4.43 | 6.24 | 4.87 | 1.41 | 13.08(5) | 5.27(8) | 13.23(0) | 120.69(3 | 785.82(2) |
| 10 | 96.82 | 6.29 | 8.05 | 6.20 | 1.28 | 13.08(7) | 5.27(7) | 13.22(4) | 120.66(1 | 785.77(4) |
| 20 | 95.11 | 6.23 | 7.98 | 6.24 | 1.28 | 13.08(1) | 5.27(6) | 13.22(7) | 120.64(7 | 785.54(3) |
| 100 | 100.0 | 3.87 | 5.92 | 4.51 | 1.53 | 13.03(3) | 5.27(9) | 13.24(1) | 120.27(9 | 786.81(5) |

TABLE III

Composition of 4 g batches containing varying amounts of excess phosphorus.

| Excess Phosphorus | β-NbPO$_5$ | P$_2$O$_5$·9Nb$_2$O$_5$ |
|---|---|---|
| 0% | 87.1% | 13.9% |
| 50% | 100% | 0% |
| 100% | 100% | 0% |

To evaluate the effect of Ta$^{5+}$ cation substitution on the stabilization of the β-phase, a range of quenching temperatures were tested for both unsubstituted and 2% Ta-substituted samples in a solution synthesis. The purities of the quenched samples are reported in Table IV. The addition of 2% Ta stabilized a pure β-phase at quenches starting from as low as 200° C., greatly contrasting attempts in the prior art, which required extremely rapid quenches above 1300° C.

TABLE IV

Purity of 0% and 2% Ta samples quenched from different temperatures.

| 0% Ta Quench | α-NbPO$_5$ | β-NbPO$_5$ | 2% Ta Quench | α-NbPO$_5$ | β-NbPO$_5$ |
|---|---|---|---|---|---|
| 200° C. | 17.0% | 83.0% | 200° C. | 0% | 100% |
| 300° C. | 0% | 100% | 300° C. | 0% | 100% |
| 400° C. | 0% | 100% | 400° C. | 0% | 100% |
| 500° C. | 0% | 100% | 500° C. | 0% | 100% |
| 1350° C. | 0% | 100% | 1350° C. | 0% | 100% |

Figure 3:
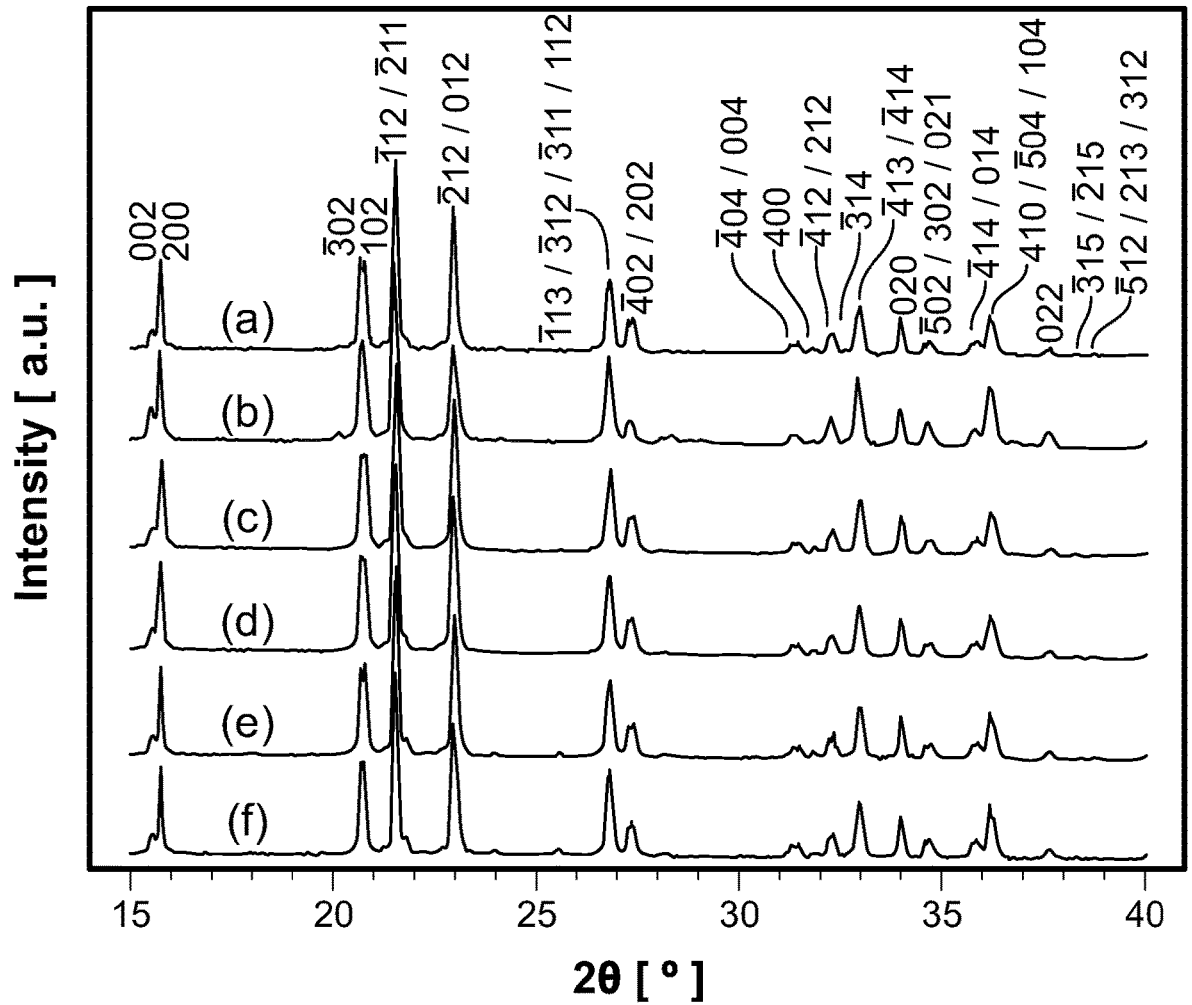
FIG. 3 is a group of x-ray diffraction patterns for a tantalum-substituted niobium phosphate according to an embodiment of the present invention.
Figure 4A:
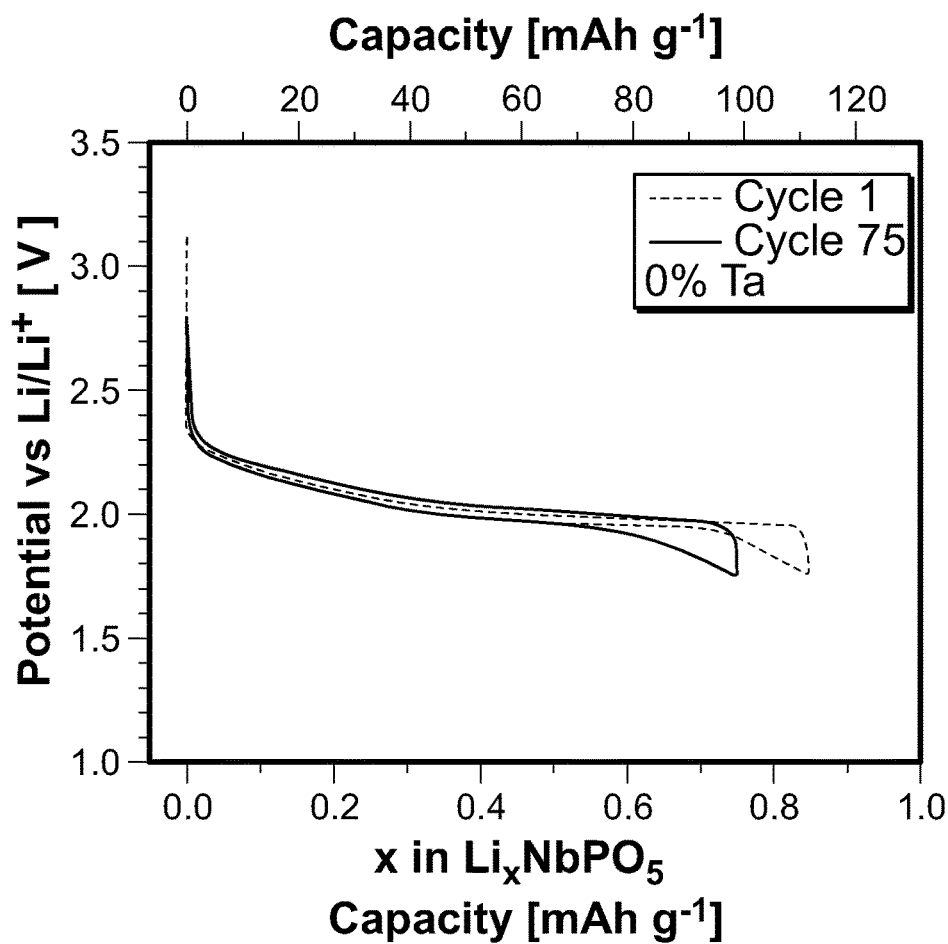
FIGS. 4A-4E are discharge profiles for lithiated tantalum-substituted niobium phosphates having various amounts of tantalum according to an embodiment of the present invention.
Figure 4B:
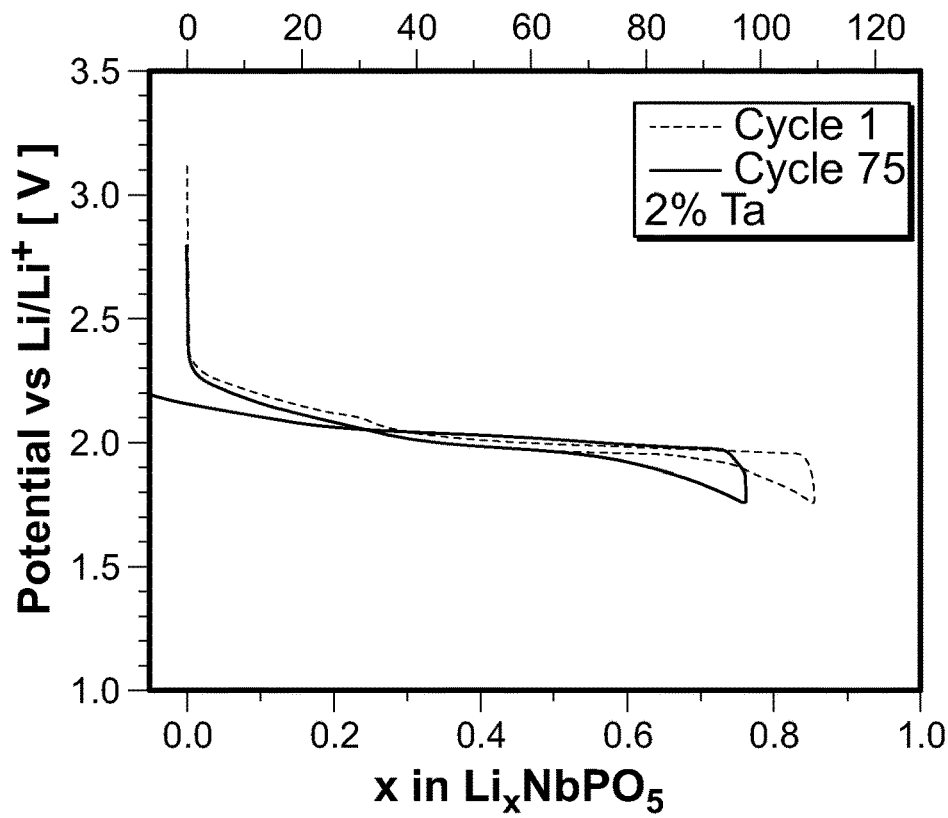
Figure 4C:
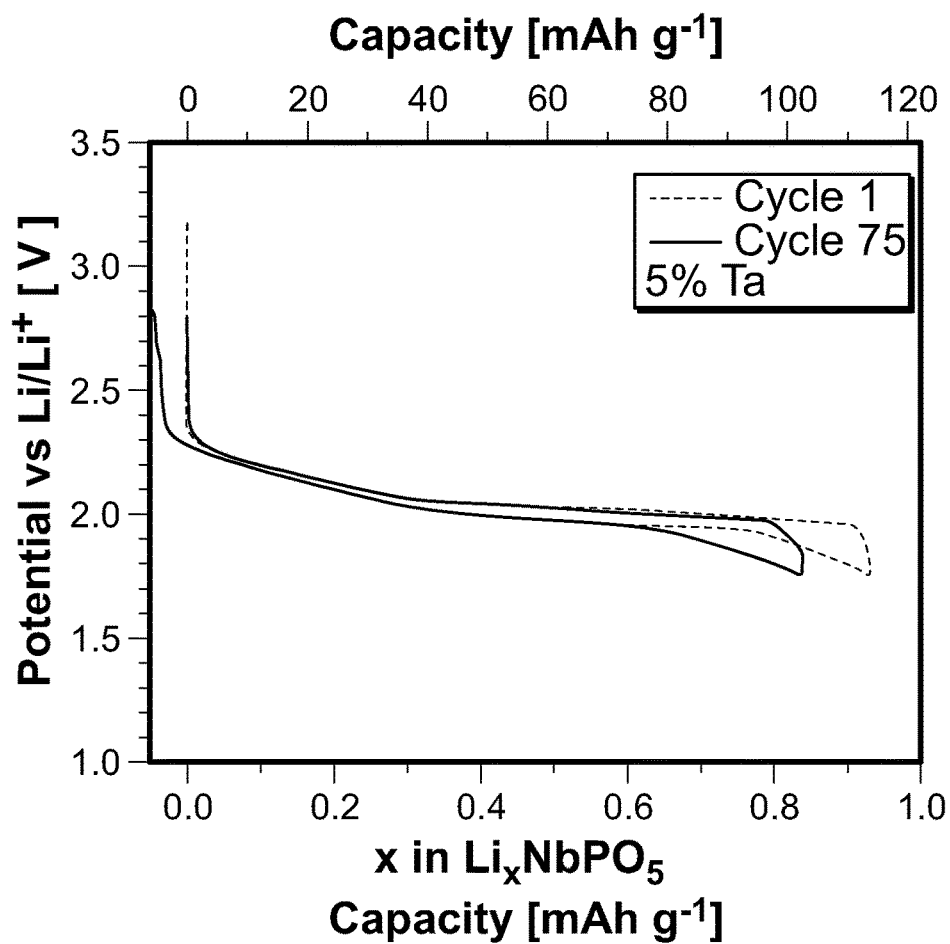
Figure 4D:
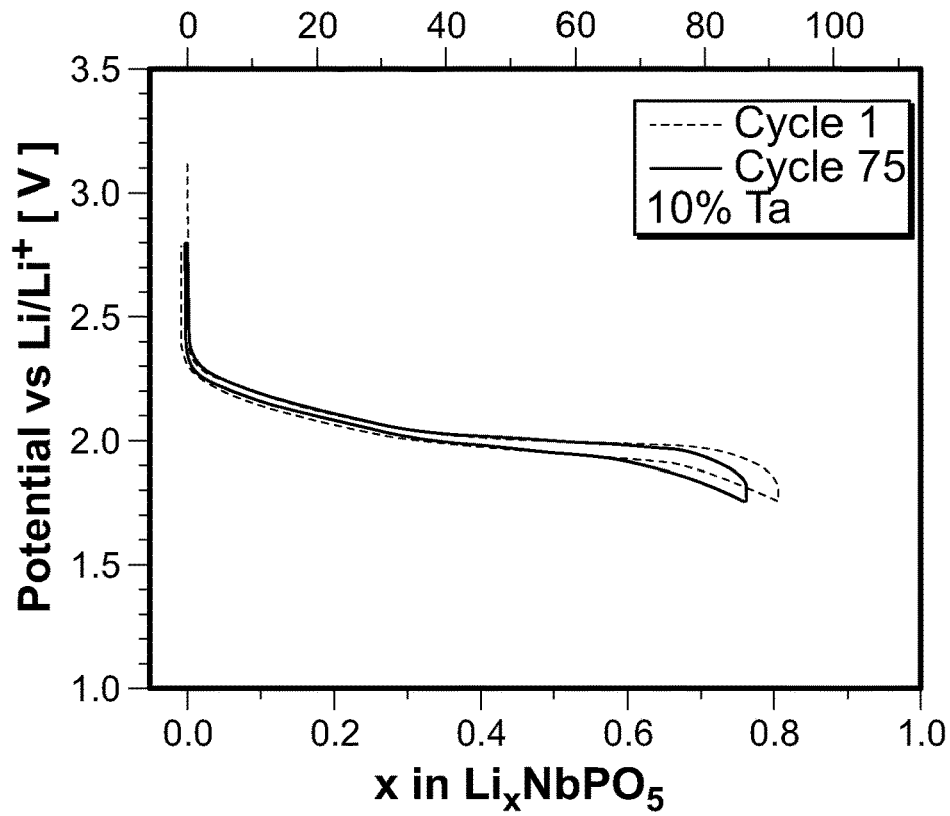
Figure 4E:
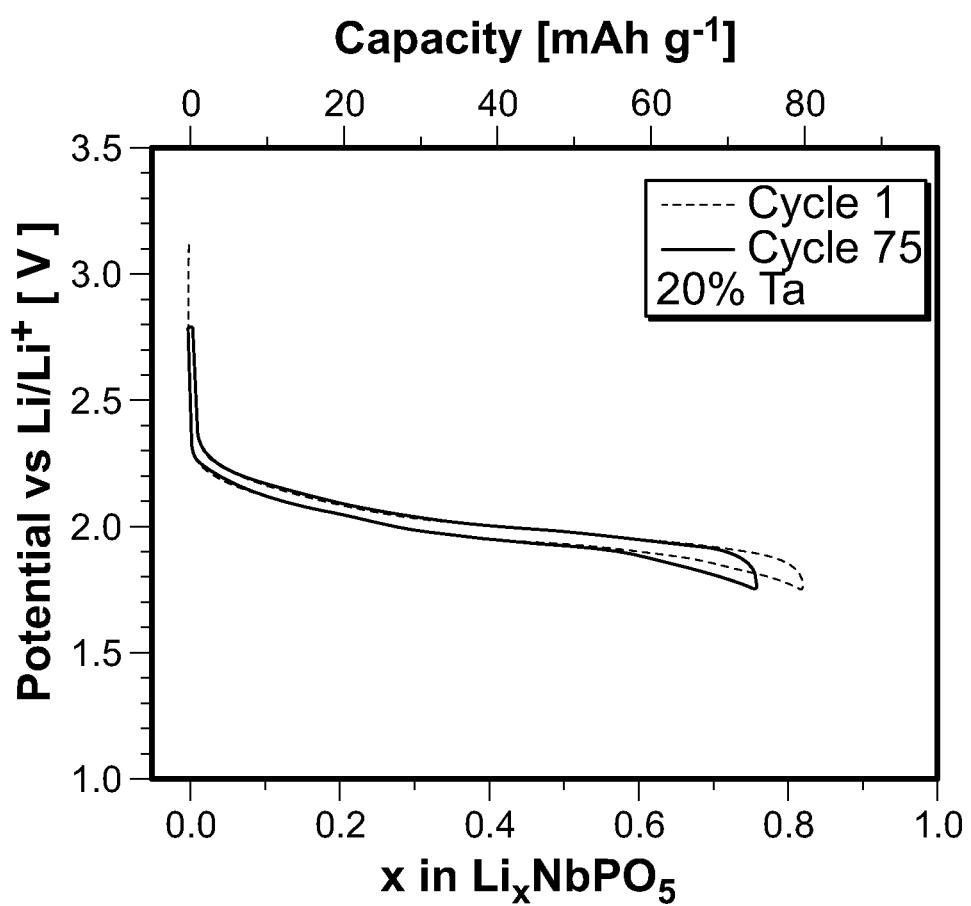

The X-ray patterns for Ta substitutions ranging from 0% to 100% prepared at 1350° C. and subsequently quenched at 1350° C. are shown in FIG. 3. All Bragg reflections can be indexed to the monoclinic unit cell of the β-phase and only very small amounts of secondary phases are present. The 10% and 20% Ta samples required a larger stoichiometric excess of phosphorus from 50 to 100% to yield higher purity with less than 5% P$_2$O$_5$·9 Nb$_2$O$_5$ present as an impurity phase. Higher amounts of excess phosphorus were tested, but resulted in samples fusing to the crucible during heat Electrochemistry The Ta$_x$Nb$_{1-x}$PO$_5$ compositions were slowly cycled against a lithium metal anode in 1M LiPF$_6$ (EC:DMC 1:1 in volume) at 7.5 mA·g$^{-1}$ (C/12–C/15) to obtain the voltage profiles of the 1st and 75th cycles shown in FIG. 4. The specific capacities upon the first lithiation and delithiation are tabulated in Table VI. The experimental data show a reasonable and systematic agreement with the theoretical specific capacity with most samples within 85-90% of theoretical capacity. Interestingly, the samples demonstrate exceptionally low loss of less than 1% between the first lithiation and delithiation. The voltage profile associated with the Li$^+$ insertion process systematically evolves as a function of Ta substitution. This is most apparent in the second half of the voltage profile where the profile develops an increasing slope and lower polarization/hysteresis with increasing Ta substitution. From these voltage profiles, it becomes clear that increasing amounts of Ta results in a more sloped voltage profile of lower polarization while also decreasing the discharge capacity, commensurate with the electrochemical inactivity of Ta in the voltage range we have investigated.

TABLE VI

Discharge capacities of the first cycle at 7.5 mA · g$^{-1}$ from 2.8 V to 1.75 V.

| % Substitution | Theoretical Specific Capacity [mAh · g$^{-1}$] | 1$^{st}$ Lithiation [mAh · g$^{-1}$] | 1$^{st}$ Delithiation [mAh · g$^{-1}$] | Coulombic Efficiency |
|---|---|---|---|---|
| 0 | 131.46 | 111.25 | 111.82 | 100.5% |
| 2 | 127.73 | 110.29 | 109.60 | 99.4% |
| 5 | 122.25 | 113.65 | 113.55 | 99.9% |
| 10 | 113.42 | 91.556 | 92.501 | 101.0% |
| 20 | 96.81 | 79.632 | 78.865 | 99.0% |

Figure 5A:
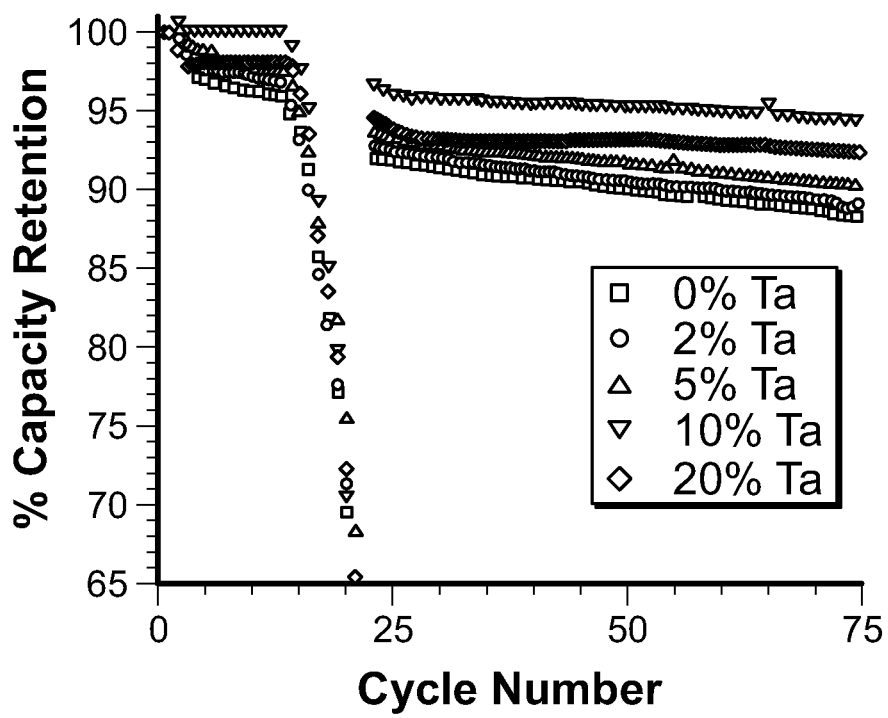
FIG. 5A is a plot of the percent of capacity retention as a function of the number of discharge cycles for lithiated tantalum-substituted niobium phosphates having various amounts of tantalum according to an embodiment of the present invention.
Figure 5B:
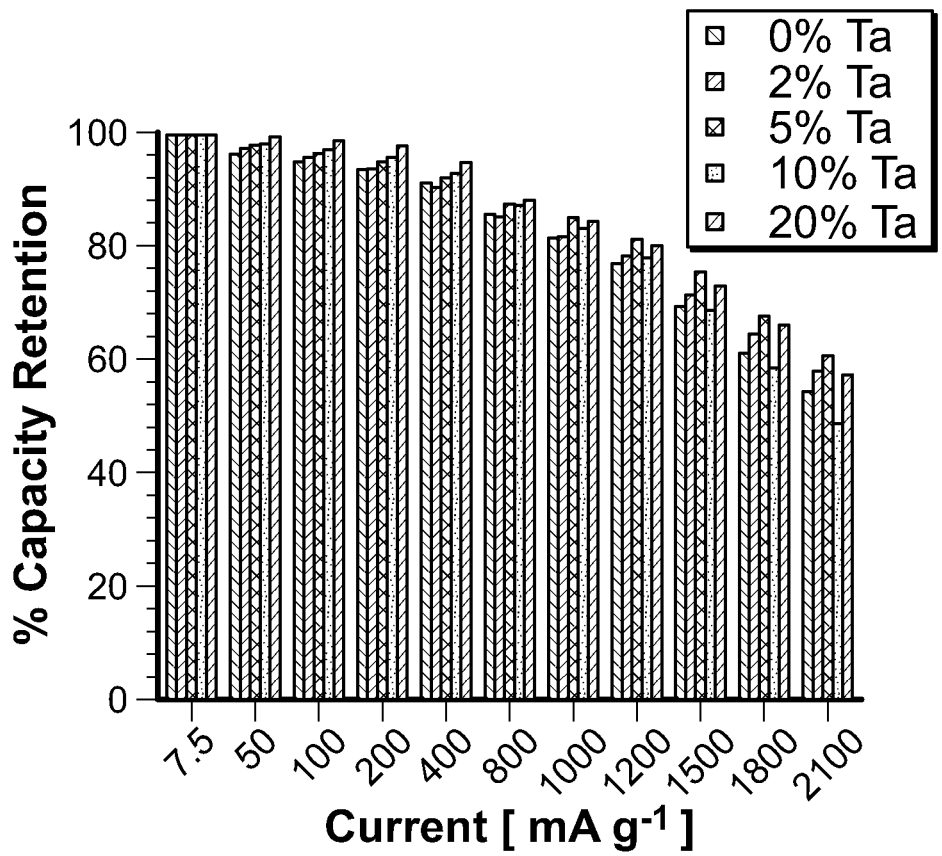
FIG. 5B is a bar chart of the percent of capacity retention as a function of discharge rate for lithiated tantalum-substituted niobium phosphates having various amounts of tantalum according to an embodiment of the present invention.

The rate capabilities of Ta$_x$Nb$_{1-x}$PO$_5$ cells with x=0, 0.02, 0.05, 0.10, and 0.20 were evaluated up to rates of 2100 mA·g$^{-1}$ (19 C-26 C) and then subjected to continued cycling at 22.5 mA·g$^{-1}$ (C/5-C/4) using the same voltage range of 2.8V to 1.75V. FIGS. 5A and 5B show the relative capacity retention with respect to the first cycle (FIG. 5A) and the rate capabilities (FIG. 5B). Up to 60% utilization was observed at approximately 20 C rate. No negative effects on the rate capability were observed from higher amounts of Ta substitution. However, when monitoring capacity retention as a function of cycle number, a notable improvement is seen when increasing Ta substitution in FIGS. 5A and 5B. The improved cycling is also represented in FIGS. 4A-4E, where larger amounts of Ta substitution result in greater stability of the voltage profile after 75 cycles.

Figure 6A:
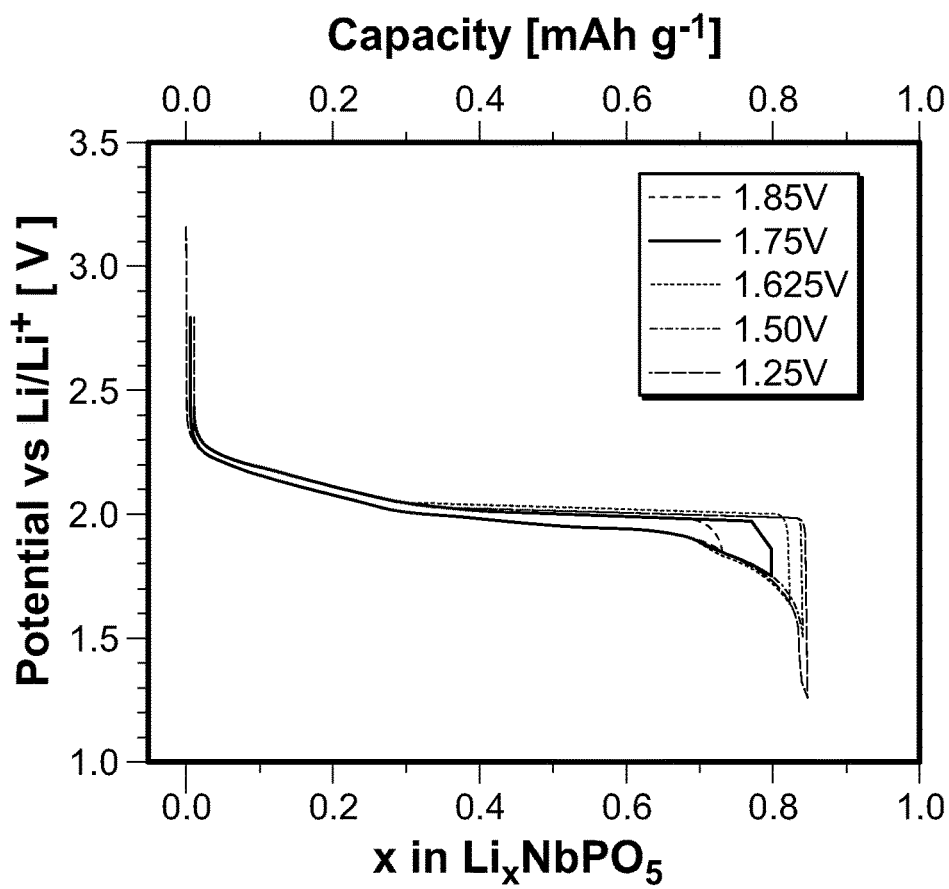
FIG. 6A is a voltage profile for an unsubstituted lithiated niobium phosphate according to an embodiment of the present invention.
Figure 6B:
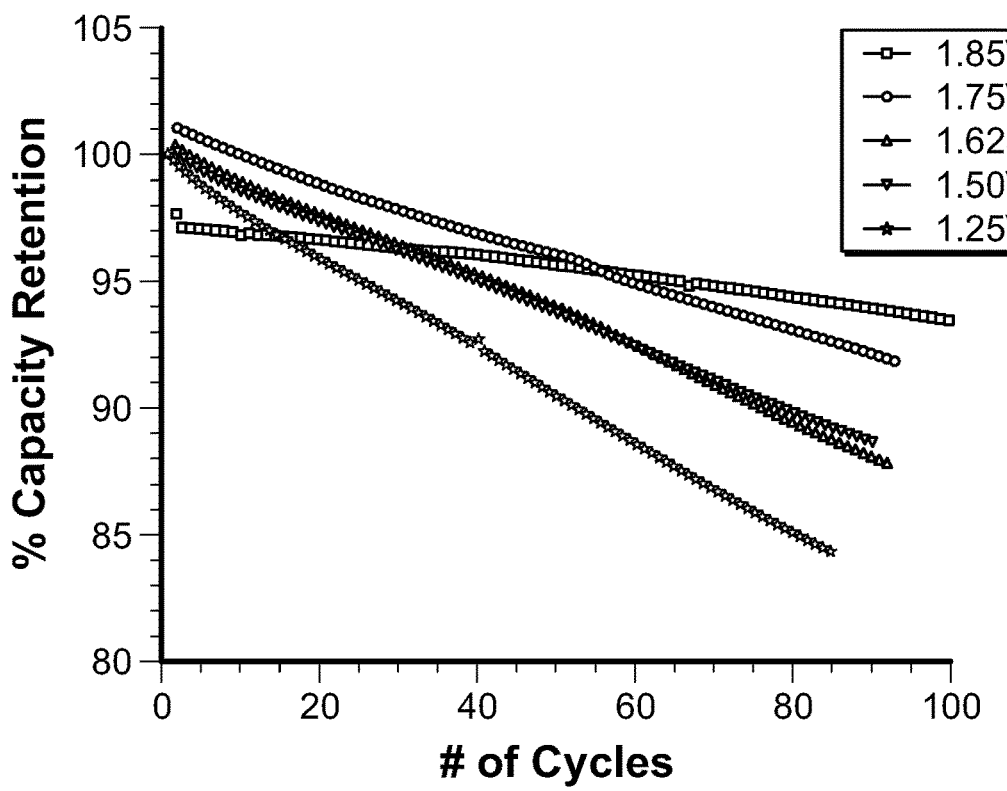
FIG. 6B is a plot of the discharge capacity retention of the unsubstituted lithiated niobium phosphate of FIG. 6A cycled to various cutoff voltages according to an embodiment of the present invention over extended cycling.

The voltage profile of the unsubstituted NbPO$_5$ sample suggests a possible deleterious reaction occurring at voltages less than 1.8V. To test such theory, various discharge cutoff voltages were tested for the unsubstituted sample and their voltage profiles are overlaid in FIG. 6A and the percentage capacity retention as a function of cycle number in FIG. 6B. All cutoff ranges experienced good cycling efficiency with greater than 90% retention after 50 cycles. However, a systematic improvement in cycling efficiency is clearly seen as the discharge cutoff voltage is raised with a marked improvement for 1.75V and an especially dramatic improvement for the 1.85V cutoff. The latter exhibited approximately 3% loss after 100 cycles. The improvement in cycling stability is consistent with the avoidance of the anomaly in the voltage profile below 1.8V discussed above.

FIGS. 7A-7E present the effects on the voltage profile after 85 cycles at different low voltage cutoffs. It can be clearly seen that the voltage feature at least 1.8V led to a considerable increase in polarization that subsequently affected the entire voltage profile, as was especially seen for the 1.25V cutoff. When this feature was avoided by increasing the discharge voltage cutoff, the polarization increase was minimal or non-existent, similar to the effect of increasing Ta substitutions.

Figure 8:
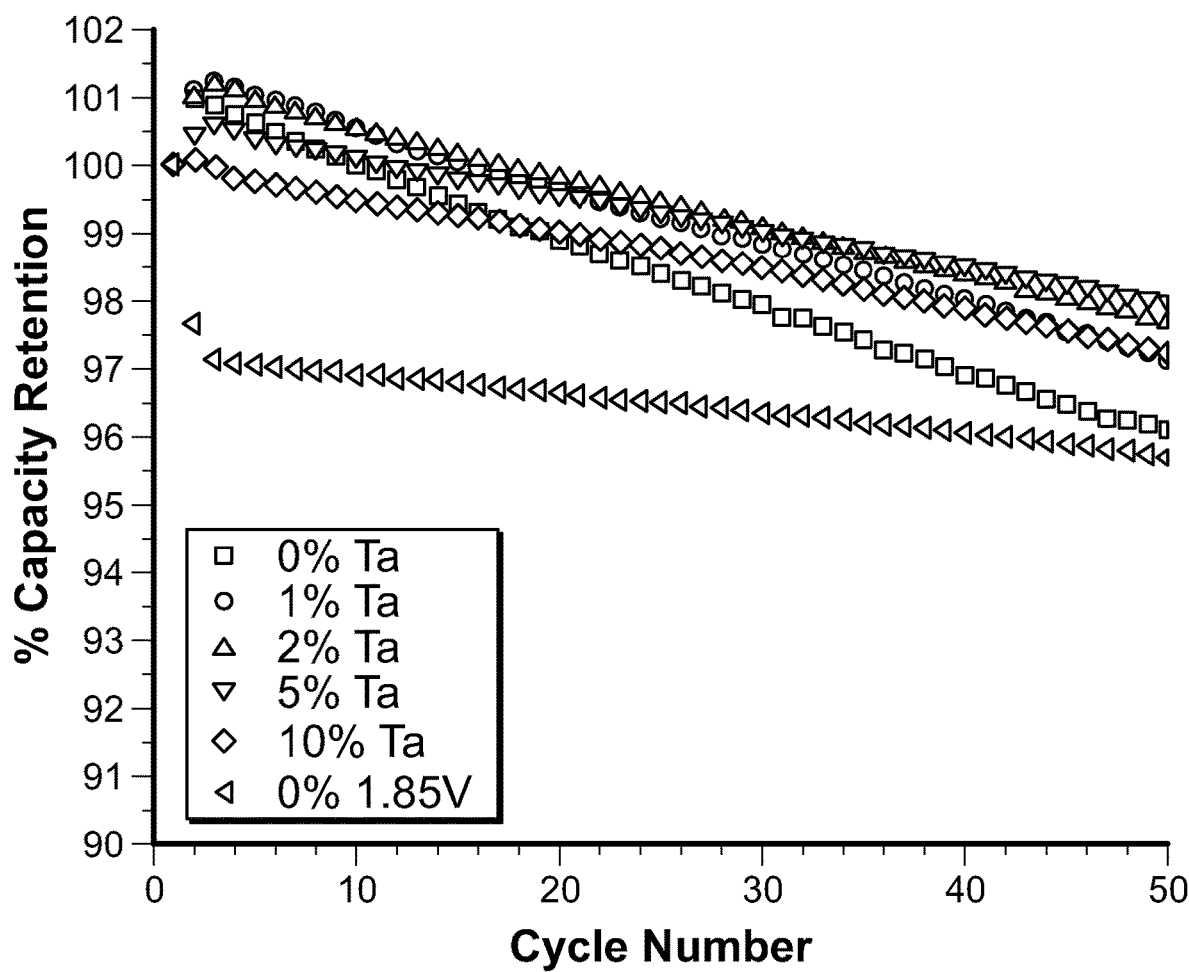
FIG. 8 is a plot of percent capacity retention over cycle numbers of lithiated tantalum-substituted niobium phosphates having various amounts of tantalum according to an embodiment of the present invention.

The improved cycling efficiency obtained from changing the cutoff voltage to 1.85V is compared to the cycling stabilities of various Ta substitutions in FIG. 8. All of the Ta substitutions display an improvement in cyclability over the 0% unsubstituted sample with the standard 1.75V cutoff. The samples with 2%, 5%, and 10% substitutions show cycling retention on par with that of the 0% sample cycled at the higher voltage cutoff of 1.85V.

Figure 9B:
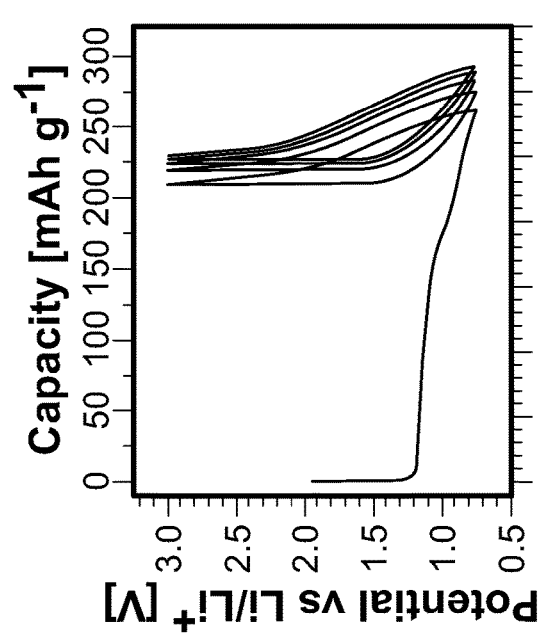
FIGS. 9A-9C are a group of voltage profiles for a tantalum phosphate cycled to decreasing voltages and higher lithium content.
Figure 9C:
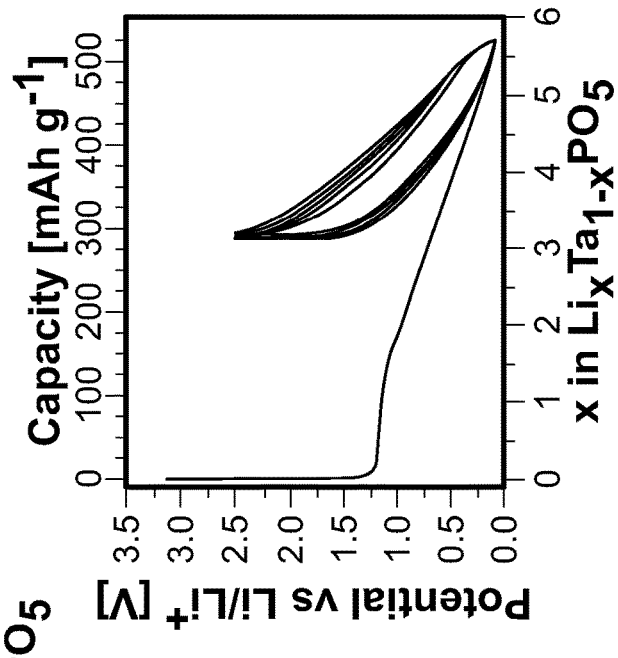
Figure 9A:
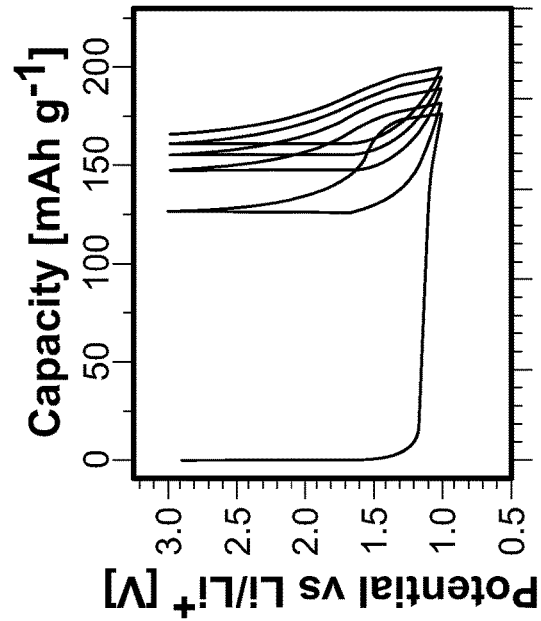

To further investigate the effects of Ta substitution, the isostructural material β-TaPO$_5$ was synthesized and cycled versus a lithium metal anode. β-TaPO$_5$, represents the end member of the Ta-substitution series of β-TaPO$_5$, and its electrochemical properties apparently have not previously been investigated. Because TaPO$_5$ operates on the Ta$^{5+}$/Ta$^{4+}$ reduction/oxidation around 1.25V, much lower than Nb$^{5+}$/Nb$^{4+}$, the cell's discharge cutoff voltage was lowered to 1V, 0.75V, and 0.075 V (see FIGS. 9A-9C) using SS316 stainless steel-based coin cells, preventing formation of lithium-aluminum alloys at low voltages. It is clear that although isostructural, β-TaPO$_5$ does not exhibit the reversibility of β-NbPO$_5$. Upon the first lithiation, there is a large irreversible transformation followed by a solid solution insertion process with a large hysteresis. The data suggests that at sufficiently low voltages a conversion process may result, but further investigation is outside the scope of this paper. With respect to the context of the paper, these results make it reasonable that the Ta-rich β-phases do not have any intrinsic capacity in the voltage ranges explored for the Ta substituted β-NbPO$_5$ materials.

Discussion of Experimental Results
Electrochemistry

At least two electrochemical results disclosed herein appear to be previously unknown in the art, and may be considered to be surprising. First, the data shows a distinct improvement in an already proficient cycling stability and a decrease in polarization with cycle number when the lower voltage region of the unsubstituted β-NbPO$_5$ less than 1.8V is avoided. Second, an analogous improvement of cycling and a decrease of polarization with cycle number is demonstrated by increasing Ta$^{5+}$ substitution for Nb$^{5+}$. The voltage profiles of the latter with increasing substitutions of Ta also systematically decrease the apparent presence of the aforementioned low voltage reaction. The connection between the presence of the lower voltage reaction and the presence of Ta is quite clear, but to confirm the lower voltage reaction mechanism was indeed evolving with Ta substitution, high-resolution electrochemical techniques were utilized.

Figure 10:
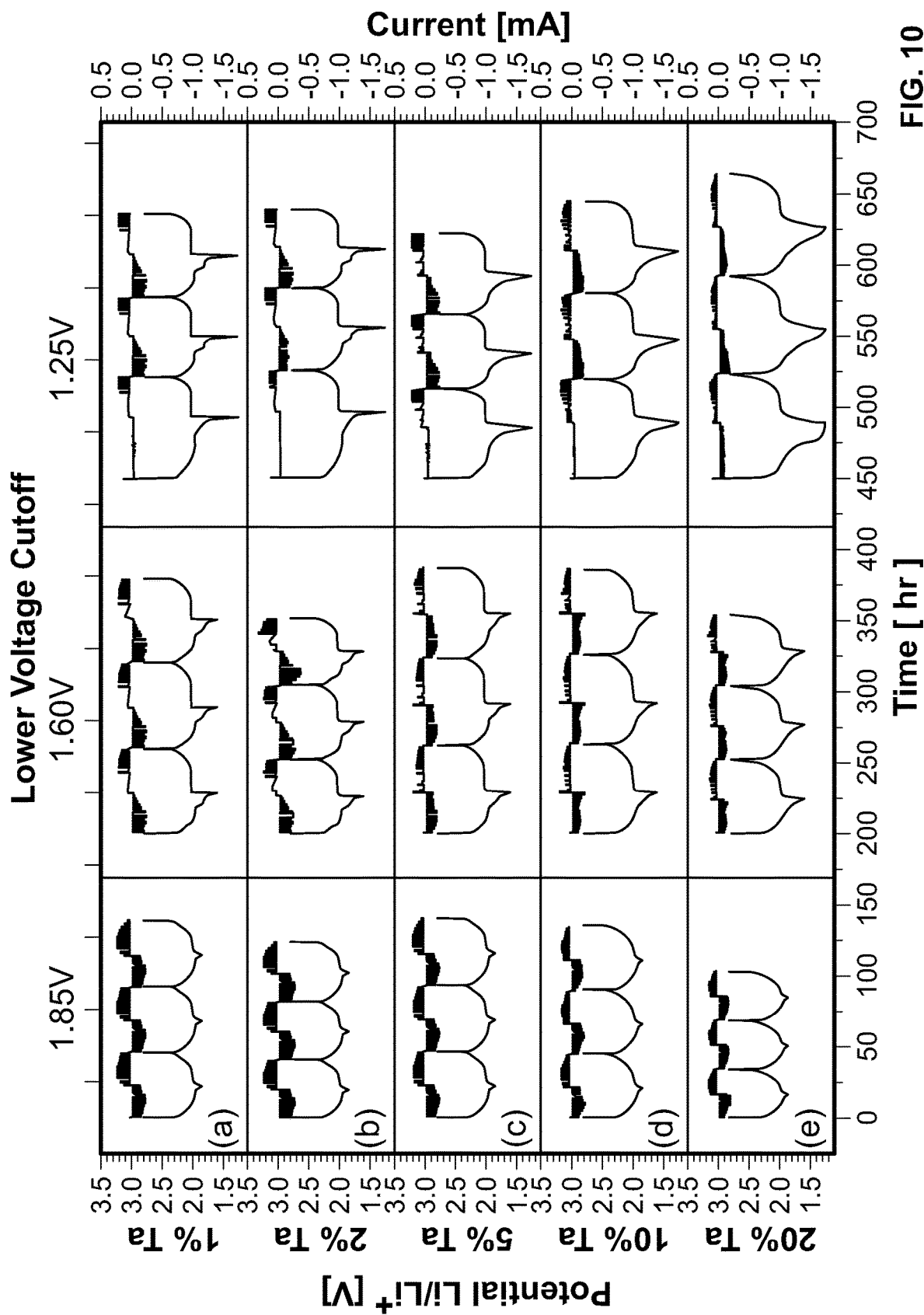
FIG. 10 is a group of PITT voltage and response current profiles for lithiated tantalum-substituted niobium phosphates having various amounts of tantalum according to an embodiment of the present invention, and at various cutoff voltages.

Potentiostatic Intermittent Titration Technique (PITT) experiments were run to obtain insight on the reaction mechanisms occurring for the unsubstituted samples as a function of low voltage cutoff and Ta substitution. Lower voltage cutoffs of 1.85V, 1.60V, and 1.25V were tested for both the unsubstituted and substituted samples and are shown in FIG. 10. The PITT current response for the first lithiation of all the samples, as expected, were similar for their respective voltage cutoffs. In contrast, during delithiation of the unsubstituted sample, a clear non-Cottrellian current response corresponding to the flat voltage segment during delithiation is clearly observed—a distinct indication of a multiphase reaction. This two-phase behavior during delithiation of the unsubstituted sample is apparent for the samples limited to a 1.60V and 1.25V cutoff, but definitively absent for the 1.85V cutoff. This suggests that the lower voltage feature below 1.8V present on the lithiation induces the multiphase reaction observed during delithiation. This behavior is completely consistent with the improved electrochemistry exemplified by improved cycling stability and lower evolution of polarization shown for samples that were limited to a 1.85V cutoff.

Interestingly, the specific capacity represented by the multiphase delithiation reaction is in far excess of the specific capacity associated with the lower voltage lithiation reaction avoided by the 1.85V PITT cutoff. In all cases, the latter part of the delithiation seems to progress in a single-phase or near single-phase reaction.

FIG. 10 unambiguously shows that increasing Ta substitution decreases and eliminates the multiphasic reaction occurring during delithiation, replicating the effect of increasing the cutoff voltage in the unsubstituted sample. This is clearly apparent in both the 1.60V and 1.25V cutoffs.

Figure 11:
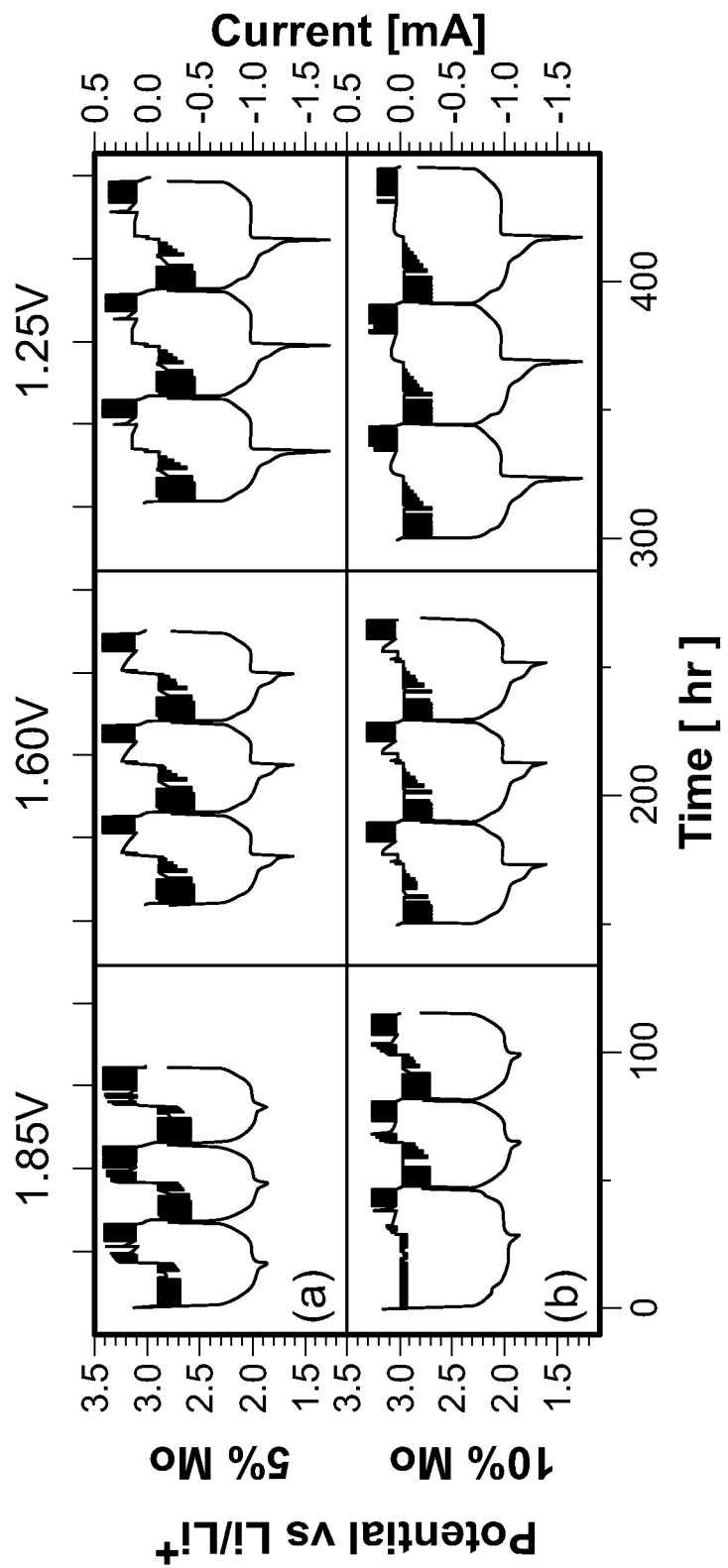
FIG. 11 is a group of PITT voltage and response current profiles for lithiated molybdenum-substituted niobium phosphates having various amounts of molybdenum according to an embodiment of the present invention, and at various cutoff voltages.
Figure 12A:
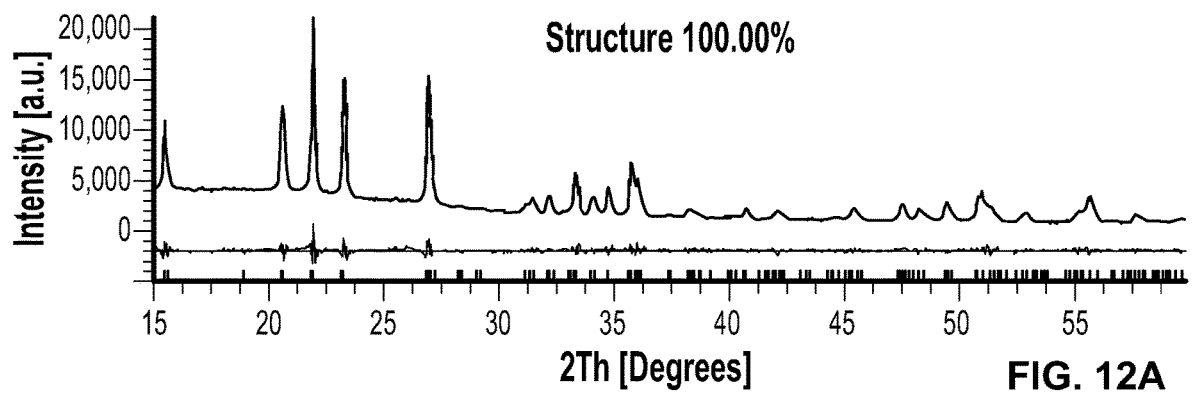
FIGS. 12A-12D are x-ray diffraction patterns with Rietveld analyses of a niobium phosphate having 0% of tantalum according to an embodiment of the present invention, and at various voltages.
Figure 12B:
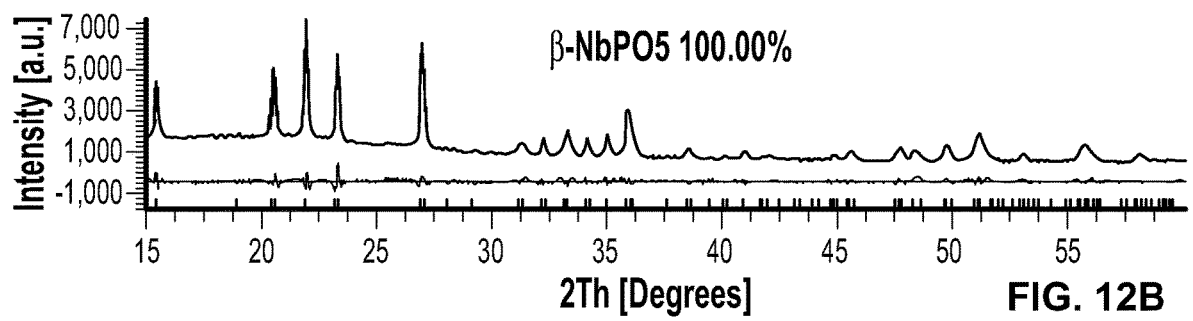
Figure 12C:
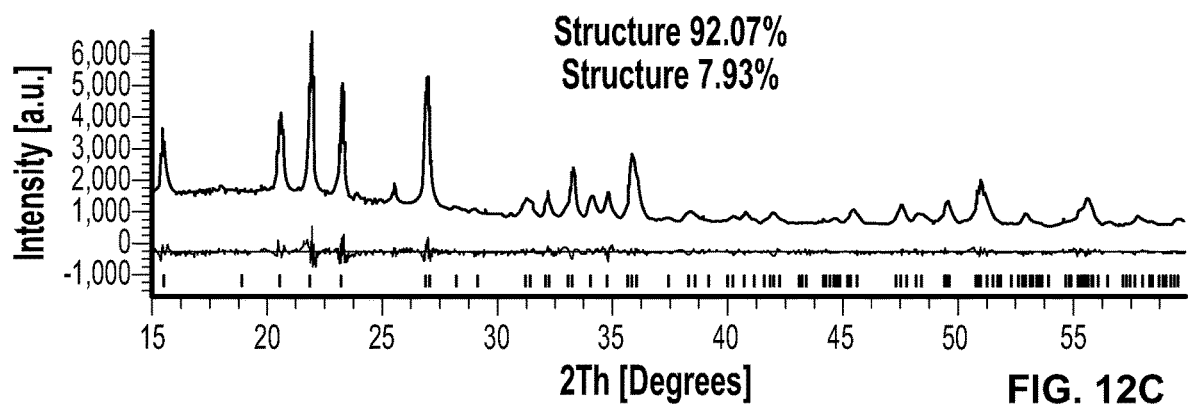
Figure 12D:
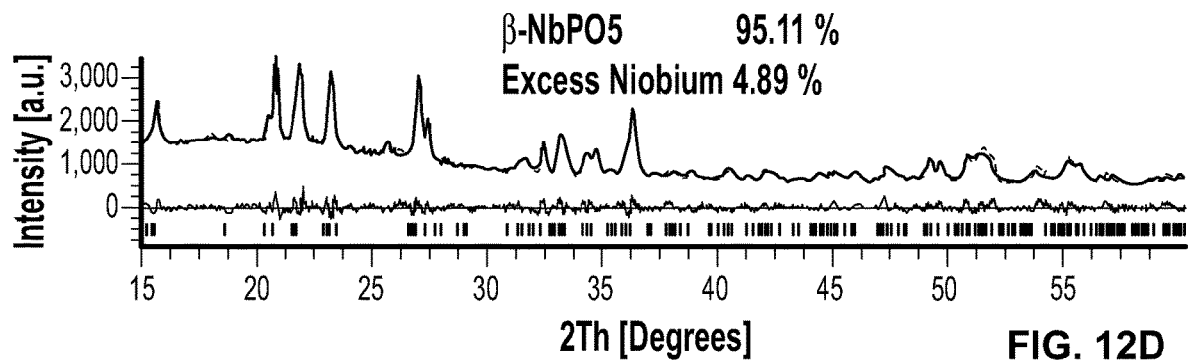

To confirm that the multiphasic reaction depletion was a result of Ta substitution, a similar PITT study was executed with 5% and 10% Mo substitutions into NbPO$_5$ using the aforementioned synthesis techniques with MoO$_3$ (Aldrich) to achieve 100% purity (50% stoichiometric excess of phosphorus). As seen in FIG. 11, the two-phase reaction during delithiation is present at all voltage cutoffs of the Mo-substituted samples, with nearly identical PITT results as obtained with the unsubstituted sample. Thus, there is a clear benefit induced by the Ta substitution specifically.

Phase Evolution

To understand the changes in the lithiation reaction preceding the multiphase reaction region, several ex-situ X-ray diffraction studies were completed. Cells were discharged to similar voltage cutoffs and Li contents to compare the discharge mechanisms.

For the 1.90V cutoff, the ex-situ XRD results summarized in Table VII reveal similar lattice volumes of about 773 Å$^3$ for all samples. In contrast, the lower 1.75V discharge reveals a distinct and systematic increase in lattice volume as a function of Ta substitution. The unsubstituted sample shows a slight increase in volume to 778 Å$^3$ whereas the substituted samples of 5% and 10% Ta show a significant increase in volume to 795 Å$^3$ and 797 Å$^3$, respectively. The volume expansion to 788 Å$^3$ for the highly substituted 20% sample reverts the trend slightly, while still showing a significantly greater volume than the unsubstituted sample. This observation may be linked to a lower degree of lithiation recorded for this sample (Table VII). In general, the increase in volume for all the lithiated Ta substituted samples is manifested as a systematic increase in the b and c lattice parameters while maintaining relatively invariant a lattice parameter and β angle.

Looking specifically at the unsubstituted samples and the 10% Ta sample presents an ideal comparison with similarly intercalated Li values of 0.694 and 0.667 at 1.90V and 0.814 and 0.827 at 1.75V, respectively. In addition, these two samples demonstrate a distinct contrast in electrochemical stability and phase progression upon delithiation via PITT. At 1.90V, the unsubstituted lattice volume of 773.2 Å$^3$ is in close agreement with the 10% Ta substitution lattice volume of 775.3 Å$^3$. At the lower voltage of 1.75V, a significant contrast in lattice volume of 775.3 Å$^3$ for the unsubstituted β-NbPO$_5$ exists with that of 797.1 Å$^3$ for the 10% Ta. To recall, this lower voltage region is where the lattice volume difference is observed, and also contains the electrochemically deleterious region for the unsubstituted sample as demonstrated by the change in discharge cutoff potential (see FIGS. 6A and 6B). The Rietveld fit and difference plots for the 1.75V and 1.90V samples of the unsubstituted and 10% Ta-substituted samples are shown for examination in FIGS. 12A-12D, and no sign of second phases is apparent. The 5% and 10% Mo substituted samples also show little expansion in volume at 1.75V similar to the unsubstituted sample and consistent with the electrochemical characteristics they share. As shown above by PITT analysis, the 2% Ta, 5% Mo and 10% Mo exhibit similar electrochemical characteristics comparable to the unsubstituted sample with little to no shifts in their main diffraction peaks.

Figure 13:
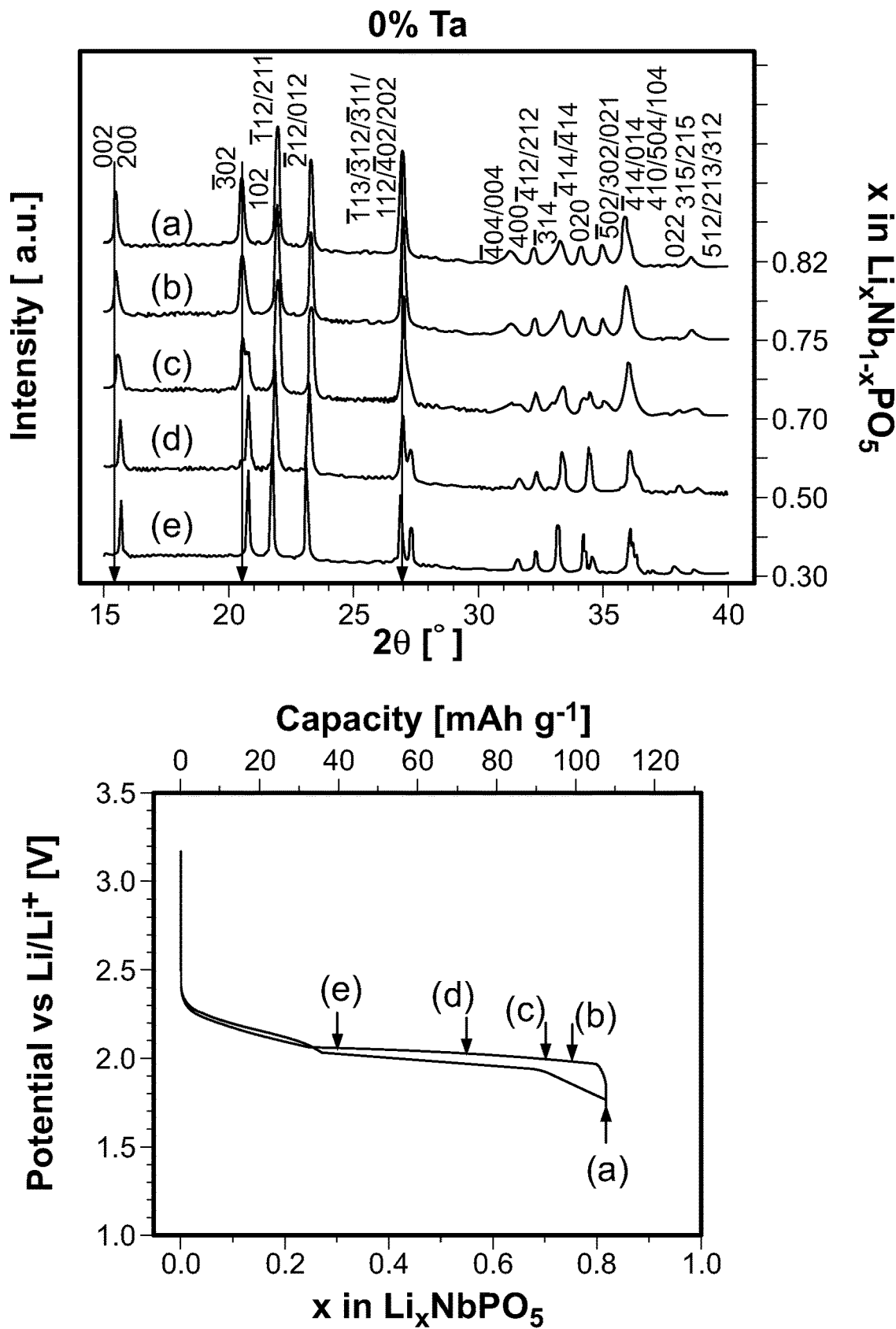
FIG. 13 includes a group of x-ray diffraction patterns (upper graph) of unsubstituted lithiated niobium phosphates having various degrees of lithiation and at the different states of charge indicated in the accompanying voltage profile (lower graph)

In order to further demonstrate the disparity between the delithiation mechanisms in the unsubstituted and 10% Ta samples of contrasting electrochemical performance, additional ex-situ XRD experiments were performed. Both samples were tested at the beginning of delithiation at 1.75V to contrast the different electrochemical behaviors shown by PITT of the strong two-phase behavior for the unsubstituted sample versus single-phase like reaction for the 10% Ta-substituted sample. X-ray patterns and the corresponding voltage profile are show in FIG. 13 and FIG. 14, respectively. Examination of the unsubstituted material XRD patterns (see FIG. 13) during delithiation reveals the emergence and systematic increase of a second monoclinic phase as evidenced with the apparition of additional reflections. Although occurring throughout the XRD pattern, these are most clearly seen by the development of the peaks at approximately 16°, 21°, 27°, and 31° 26, while the other Bragg reflections remain invariant. The initial and new monoclinic phase that has developed is listed in Table VIII (x=0.82 (a) vs. x=0.3 (e)). The labels "(a)", "(b)", "(c)", "(d)", and "(e)" are presented identify points on the voltage profile (lower graph) of FIG. 13 with the respective diffraction pattern (upper graph) of FIG. 13.

Figure 14:
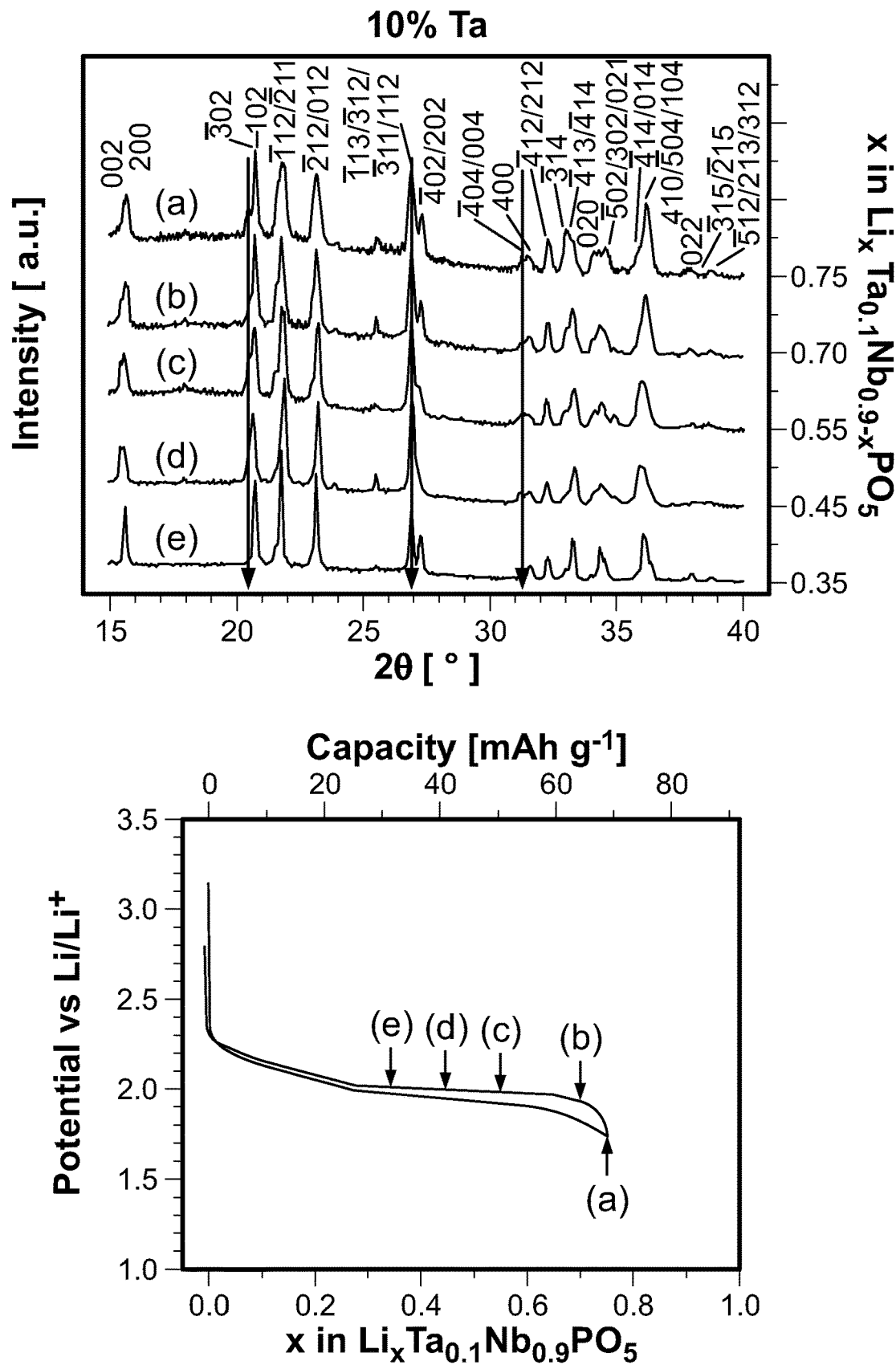
FIG. 14 includes a group of x-ray diffraction patterns (upper graph) of lithiated niobium phosphates having 10% tantalum and various degrees of lithiation, and at the different states of charge indicated in the accompanying voltage profile (lower graph).

FIG. 14 shows XRD patterns for a similar region of Li, which reveals a sharply contrasting behavior relative to the unsubstituted sample described above. As discussed earlier, the Ta substituted material has a significantly larger unit cell upon lithiation. The process of delithiation in the flatter, but sloped region of x=0.75 to x=0.35 (a-e), reveal that the monoclinic structure goes through a systematic shrinkage of the unit cell representing a solid-solution Li$_+$ insertion/de-insertion behavior. This is represented by a continuous change in Bragg reflection position and thus lattice parameter. Systematic shifts are most visually apparent in the Bragg reflections at approximately 21°, 27°, and 31° (FIG. 14) although most peaks do show systematic changes in peak position. Table IX shows that the refined lattice parameters in this region systematically decrease for b and c while a and 13 remain relatively invariant. This is the reverse of the trend in lattice parameter development we have shown for the Ta-substituted versus non-Ta-substituted during high degrees of lithiation. The labels "(a)", "(b)", "(c)", "(d)", and "(e)" are presented identify points on the voltage profile (lower graph) of FIG. 14 with the respective diffraction pattern (upper graph) of FIG. 14.

In summary, much improved cycling for β-NbPO$_5$ is manifested when the lower lithiation voltage is raised, suggesting a failure mode associated with a phase transition induced by higher degrees of lithiation approaching x=1. Lower voltage cycling is shown to be much improved by 5 to 20% Ta substitution within β-NbPO$_5$. This improved cycling seems to be associated with a distinct change in phase progression. Although unsubstituted and substituted β-NbPO$_5$ initially have similar lattice parameters, upon lithiation the Ta-substituted β-NbPO$_5$ has a significantly larger monoclinic unit cell. Upon delithiation, the slope of the voltage profile, high resolution PITT, and ex-situ XRD reveals that the delithiation reaction progresses as a two-phase reaction for the unsubstituted β-NbPO$_5$, while Ta-substituted β-NbPO$_5$ evolves via a single-phase de/insertion reaction. While the voltage is not necessarily optimal for a high energy battery, Ta-substituted β-NbPO$_5$ represents a model of lithium insertion phosphates with near 0% irreversible loss, excellent cycling stability, and excellent 20 C rates in large grains without the formation of a conductive nanocomposite.

TABLE VII

Rietveld analysis of patterns ex-situ samples.

| Sample | x value | wt % | GOF | a [Å] | b [Å] | c [Å] | Beta [°] | Volume [Å$^3$] |
|---|---|---|---|---|---|---|---|---|
| 0% Ta 1.90 V | 0.694 | 100 | 2.83 | 13.22(7) | 5.15(2) | 13.08(8) | 119.92(5) | 773.21(1) |
| 0% Ta 1.75 V | 0.814 | 100 | 2.30 | 13.17(3) | 5.13(7) | 13.24(8) | 119.75(5) | 778.41(6) |
| 2% Ta 1.90 V | 0.732 | 100 | 2.03 | 13.22(1) | 5.16(0) | 13.07(9) | 119.98(0) | 773.02(1) |
| 2% Ta 1.75 V | 0.858 | 100 | 2.19 | 13.22(7) | 5.10(6) | 13.31(4) | 120.14(7) | 777.79(0) |
| 5% Ta 1.90 V | 0.780 | 100 | 1.66 | 13.22(4) | 5.15(4) | 13.08(2) | 119.93(1) | 772.87(2) |
| 5% Ta 1.75 V | 0.901 | 100 | 2.92 | 13.11(6) | 5.21(9) | 13.39(6) | 119.86(8) | 795.32(3) |
| 10% Ta 1.90 V | 0.667 | 93.4 | 1.88 | 13.18(1) | 5.14(8) | 13.13(6) | 119.58(7) | 775.29(6) |
| 10% Ta 1.75 V | 0.827 | 95.1 | 2.07 | 13.10(1) | 5.23(6) | 13.88(1) | 119.74(5) | 797.12(6) |
| 20% Ta 1.90 V | 0.592 | 91.7 | 2.33 | 13.15(0) | 5.19(1) | 13.06(0) | 119.87(7) | 773.14(5) |
| 20% Ta 1.75 V | 0.789 | 99.0 | 2.00 | 13.15(5) | 5.16(0) | 13.37(8) | 120.02(4) | 786.25(8) |
| 5% Mo 1.90 V | 0.611 | 100 | 2.16 | 13.20(8) | 5.13(9) | 13.09(0) | 120.02(6) | 769.39(8) |
| 5% Mo 1.75 V | 0.775 | 100 | 2.09 | 13.13(9) | 5.20(9) | 13.01(6) | 119.91(3) | 771.54(4) |
| 10% Mo 1.90 V | 0.797 | 100 | 2.00 | 13.23(1) | 5.15(2) | 13.09(5) | 119.94(7) | 773.67(7) |
| 10% Mo 1.75 V | 0.888 | 100 | 1.76 | 13.25(6) | 5.13(8) | 13.14(7) | 120.02(1) | 775.35(0) |

TABLE VIII

Rietveld analysis of ex-situ XRD of the unsubstituted samples from x = 0.82 (a) to x = 0.30(e).

| x in $Li_xNb_{1-x}PO_5$ | GOF | a [Å] | b [Å] | c [Å] | Beta [°] | Volume [Å$^3$] |
|---|---|---|---|---|---|---|
| 0.82 (discharge) | 2.16 | 13.26(1) | 5.13(4) | 13.16(0) | 120.01(6) | 776.01(7) |
| 0.75 (charge) | 2.04 | 13.19(6) | 5.13(7) | 13.17(4) | 119.66(8) | 776.08(0) |
| 0.70 (charge) | 2.62 | 13.22(1) | 5.15(0) | 13.15(4) | 120.40(6) | 772.62(2) |
| 0.55 (charge) | 1.64 | 13.12(1) | 5.21(7) | 13.05(5) | 120.01(8) | 773.84(3) |
| 0.30 (charge) | 1.76 | 13.08(8) | 5.24(2) | 13.12(5) | 120.22(5) | 778.25(7) |

TABLE IX

Rietveld analysis of ex-situ XRD of 10% Ta samples.

| $Li_xTa_{0.1}Nb_{0.9-x}PO_5$ | GOF | a [Å] | b [Å] | c [Å] | Beta [°] | Volume [Å$^3$] |
|---|---|---|---|---|---|---|
| 0.75 (discharge) | 2.38 | 13.10(1) | 5.25(6) | 13.23(2) | 120.09(2) | 788.39(7) |
| 0.70 (charge) | 2.47 | 13.10(5) | 5.23(4) | 13.14(2) | 120.14(1) | 779.66(8) |
| 0.55 (charge) | 2.66 | 13.20(7) | 5.19(7) | 13.10(1) | 120.07(7) | 778.22(1) |
| 0.45 (charge) | 2.32 | 13.20(0) | 5.18(7) | 13.08(7) | 119.98(1) | 776.27(7) |
| 0.35 (charge) | 2.00 | 13.10(1) | 5.20(2) | 13.01(4) | 120.00(4) | 768.25(8) |

Summarizing the foregoing discussion, in embodiments of the present invention, substitution of Ta into the lattice of β-NbPO$_5$ results in improved reversibility, near 0% irreversible loss and similar excellent 20 C high rate behavior in large grain material without the formation of electronically conducting nanocomposites. Further, Ta substitution into NbPO$_5$ enables an improved stabilization of the difficult to fabricate β-NbPO$_5$ phase, which is isostructural with the β-TaPO$_5$ end member. Much improved cycling stability can be extracted from β-NbPO$_5$ if a lower voltage transformation is eliminated. We find that this can be accomplished by raising the cutoff voltage or substituting at least 5% Ta into NbPO$_5$. In addition, avoiding the lower voltage region below 1.8V decreases the polarization and evolution of polarization while improving the reversibility of the cell. A similar effect is seen with a 10% substitution while still cycling down to 1.75V. Through the use of a comprehensive series of PITT and XRD analyses, this improvement was correlated to a distinct change in the two-phase delithiation pathway for the β-NbPO$_5$ versus that of the single-phase reaction for β-Ta$_x$Nb$_{1-x}$PO$_5$.

It will be understood that the embodiments of the present invention described herein are merely exemplary and that a person skilled in the art may make many variations and modifications without departing from the spirit and scope of the invention. All such variations and modifications are intended to be included within the scope of the invention, selected embodiments of which are also encompassed by the attached list of claims.

The invention claimed is:

1. A composition consisting essentially of $Nb_{(1-x)}M_xPO_5$, wherein M is at least one transition metal selected from among the Group 5 transition metals and the Group 6 transition metals, wherein x is a value that is greater than 0 and less than 1, and wherein M is selected from the group consisting of tantalum, vanadium, chromium, molybdenum, tungsten, or any combinations thereof.

2. The composition of claim 1, wherein M is tantalum.

3. The composition of claim 1, wherein the composition has a monoclinic crystalline structure.

4. The composition of claim 3, wherein the crystal structure has lattice parameters of a=−12.9 Å to 13.3 Å, b=5.1 Å to 5.5 Å, c=13.0 Å to 13.4 Å and the Beta angle=119.7 degrees to 121.7 degrees.

5. A composition comprising $Nb_{(1-x)}Ta_xPO_5$ and at least one other chemical component, wherein x is a value that is greater than 0 and less than 1.

6. The composition of claim 5, wherein the composition has a monoclinic crystalline structure.

7. The composition of claim 6, wherein the crystal structure has lattice parameters of a=−12.9 Å to 13.3 Å, b=5.1 Å to 5.5 Å, c=13.0 Å to 13.4 Å and the Beta angle=119.7 degrees to 121.7 degrees.

* * * * *